US008924099B2

(12) United States Patent
Nelson, Jr.

(10) Patent No.: US 8,924,099 B2
(45) Date of Patent: Dec. 30, 2014

(54) SYSTEM AND METHOD FOR DETERMINING IMPLEMENT TRAIN POSITION

(71) Applicant: Raven Industries, Inc., Sioux Falls, SD (US)

(72) Inventor: Robert Leonard Nelson, Jr., Austin, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 4 days.

(21) Appl. No.: 13/796,137

(22) Filed: Mar. 12, 2013

(65) Prior Publication Data
US 2014/0277954 A1 Sep. 18, 2014

(51) Int. Cl.
G06F 17/00 (2006.01)
G06F 7/70 (2006.01)
G06F 19/00 (2011.01)
A01B 76/00 (2006.01)
A01C 21/00 (2006.01)
G06F 11/30 (2006.01)

(52) U.S. Cl.
CPC ............... *A01B 76/00* (2013.01); *A01C 21/00* (2013.01); *G06F 11/30* (2013.01)
USPC .......................................................... 701/50

(58) Field of Classification Search
CPC .. A01B 69/00; A01B 6/00; G05D 2201/0201; G06F 11/30; A01C 21/00
USPC .......................................................... 701/50
See application file for complete search history.

(56) References Cited

U.S. PATENT DOCUMENTS

| 4,184,551 | A | 1/1980 | Orthman |
| 5,375,059 | A | 12/1994 | Kyrtsos et al. |
| 5,390,125 | A | 2/1995 | Sennott et al. |
| 5,438,517 | A | 8/1995 | Sennott et al. |
| 5,555,503 | A | 9/1996 | Kyrtsos et al. |
| 5,610,815 | A | 3/1997 | Gudat et al. |
| 5,629,855 | A | 5/1997 | Kyrtsos et al. |
| 5,928,309 | A | 7/1999 | Korver et al. |
| 5,941,317 | A | 8/1999 | Mansur |
| 6,052,647 | A | 4/2000 | Parkinson et al. |

(Continued)

OTHER PUBLICATIONS

"SBG Precision Farming: Appendix A, Product Overview 2014", (2014), 11 pgs.

(Continued)

*Primary Examiner* — Mary Cheung
*Assistant Examiner* — Frederick Brushaber
(74) *Attorney, Agent, or Firm* — Schwegman Lundberg & Woessner, P.A.

(57) ABSTRACT

Leading vehicle position information can be used to determine a location and heading of one or more implements of a trailing vehicle in an implement train that includes the leading vehicle. In an example, the leading vehicle pulls one or more trailing vehicles, and information about the leading vehicle position or heading is used to update a function of one or more implements associated with trailing vehicles of the implement train. In an example, the present subject matter includes identifying a heading of a trailing vehicle based on its initial location, an intermediate location, and a destination location. In an example, the present subject matter includes identifying a speed of one or more points on a trailing vehicle. In some examples, the present subject matter includes determining a location, heading, or speed of multiple implements associated with multiple trailing vehicles.

25 Claims, 11 Drawing Sheets

(56) References Cited

U.S. PATENT DOCUMENTS

| | | | |
|---|---|---|---|
| 6,354,231 B1 | 3/2002 | Morris | |
| 6,434,462 B1 | 8/2002 | Bevly et al. | |
| 6,865,465 B2 | 3/2005 | McClure | |
| 7,054,731 B1* | 5/2006 | Lange et al. | 701/50 |
| 7,147,241 B2 | 12/2006 | Beaujot et al. | |
| 7,162,348 B2 | 1/2007 | McClure et al. | |
| 7,373,231 B2 | 5/2008 | McClure et al. | |
| 7,383,114 B1* | 6/2008 | Lange et al. | 701/50 |
| 7,460,942 B2 | 12/2008 | Mailer | |
| 7,490,678 B2 | 2/2009 | Unruh et al. | |
| 7,509,199 B2 | 3/2009 | Rekow | |
| 7,623,952 B2 | 11/2009 | Unruh et al. | |
| 7,715,953 B2* | 5/2010 | Shepard | 701/1 |
| 7,860,628 B2 | 12/2010 | Lange | |
| 8,190,364 B2* | 5/2012 | Rekow | 701/466 |
| 8,256,526 B2 | 9/2012 | Schmidt et al. | |
| 8,359,141 B1* | 1/2013 | Lange | 701/50 |
| 8,453,754 B2 | 6/2013 | Beaujot | |
| 8,469,114 B1 | 6/2013 | Borkgren | |
| 8,577,558 B2 | 11/2013 | Mitchell | |
| 8,583,315 B2 | 11/2013 | Whitehead et al. | |
| 8,594,879 B2 | 11/2013 | Roberge et al. | |
| 8,639,416 B2 | 1/2014 | Jones et al. | |
| 8,668,024 B2 | 3/2014 | Beaujot | |
| 2001/0018638 A1 | 8/2001 | Quincke | |
| 2004/0017285 A1* | 1/2004 | Zielinski et al. | 340/431 |
| 2004/0215374 A1* | 10/2004 | Shepard | 701/1 |
| 2005/0049773 A1* | 3/2005 | Kitapini et al. | 701/70 |
| 2006/0282205 A1* | 12/2006 | Lange | 701/50 |
| 2008/0147282 A1 | 6/2008 | Kormann | |
| 2008/0231701 A1* | 9/2008 | Greenwood et al. | 348/148 |
| 2009/0326763 A1* | 12/2009 | Rekow | 701/42 |
| 2011/0054729 A1* | 3/2011 | Whitehead et al. | 701/29 |
| 2011/0125457 A1* | 5/2011 | Lee et al. | 702/151 |
| 2011/0257860 A1* | 10/2011 | Getman et al. | 701/70 |
| 2012/0200706 A1* | 8/2012 | Greenwood et al. | 348/148 |
| 2012/0215410 A1* | 8/2012 | McClure et al. | 701/50 |
| 2012/0240546 A1 | 9/2012 | Kormann | |
| 2012/0253625 A1 | 10/2012 | Canuto et al. | |
| 2012/0261146 A1 | 10/2012 | Bolten | |
| 2012/0271522 A1* | 10/2012 | Rupp et al. | 701/70 |
| 2012/0283909 A1 | 11/2012 | Dix | |
| 2013/0110358 A1 | 5/2013 | Merx et al. | |
| 2013/0168113 A1 | 7/2013 | Gustafson | |
| 2013/0173116 A1 | 7/2013 | Gustafson et al. | |
| 2013/0186657 A1 | 7/2013 | Kormann et al. | |

OTHER PUBLICATIONS

Lechner, Wolfgang, et al., "Global Navigation Satellite Systems", Computers and Electronics in Agriculture, 25(2000), [online]. Retrieved from the Internet: <URL: http://oldwww.phys.washington.edu/users/jeff/courses/588A/presentationfiles/dolmstead111209references/Global%20Navigation%20satellite%20systems.pdf>, (2000), 67-85.

Van Zuydam, R. P., "Centimeter-Precision Guidance of Agricultural Implements in the Open Field by Means of Real Time Kinematic Dgps", Proceedings of the Fourth International Conference on Precision Agriculture, (1999), 1023-1034.

* cited by examiner

SYSTEM AND METHOD FOR DETERMINING IMPLEMENT TRAIN POSITION

CROSS-REFERENCE TO RELATED PATENT DOCUMENTS

This patent application is also related to VEHICLE GUIDANCE BASED ON TRACTOR POSITION, filed on even date herewith.

TECHNICAL FIELD

This document pertains generally, but not by way of limitation, to systems, devices, and methods for determining one or more of a location, speed, or heading of one or more points on an implement train.

BACKGROUND

Implement trains can include one or more vehicles that are coupled and pulled by a leading vehicle, or prime mover. In an example, implement trains include agricultural equipment pulled by a leading vehicle (e.g., a tractor). For instance, an implement train may include one or more vehicles such as wagons, carts, planters, fertilizers, or the like, pulled by a leading vehicle. Implements coupled to one or more of the vehicles can distribute agricultural products, including one or more of seed, liquid or granular fertilizer, chemicals, or other materials, from storage containers, for instance using one or more metering devices. In some examples, seed and fertilizer are released from an implement and deposited into furrows.

The vehicles of an implement train may have one or more fixed axles, or one or more rotatable axles. The vehicles of an implement train generally include a tongue and hitch to allow for the proximal and distal coupling of each of the vehicles with adjacent preceding and proceeding vehicles. An articulating joint can be formed between each of the vehicles at the couplings between respective hitches and tongues.

A GPS receiver and antenna can be coupled to one or more of a leading vehicle, a trailing vehicle, or an implement coupled to a leading or trailing vehicle. In some examples, multiple receivers and antennas are used. For example, an implement including a planter unit can include a GPS receiver, and a coulter on the planter unit can be used to steer the planter unit independently from the leading vehicle. In other examples, implement trains include GPS receivers on planter units and on the leading vehicle. A central controller integrates GPS locations of both the leading vehicle and the planter units to determine a suitable route for the leading vehicle and the planter. However, such systems require GPS receivers on more than one of the vehicles of the implement train with the attendant maintenance and installation of the same.

OVERVIEW

The present inventor has recognized, among other things, that a problem to be solved can include accurate, position-based control of implements on one or more trailing vehicles of an implement train, for example, as the trailing vehicles are pulled along non-linear paths by a leading vehicle. An implement train includes vehicles (e.g., carts, wagons, or the like) with rotating axles or one or more articulated joints between adjacent vehicles of the implement train. As a leading vehicle traverses a non-linear path, the one or more trailing vehicles follow paths different from that of the leading vehicle because of one or more of the articulated joints or rotating axles. Furthermore, different points on a trailing vehicle may travel at different speeds or in different directions, such as when the leading vehicle pulls the trailing vehicle along a non-linear path. Thus, without accurate position information, an implement (e.g., a row unit, planter unit, fertilizer unit, or the like) on a designated trailing vehicle may seed, apply an agricultural product, or perform another function, at a field location away from a desired location based on the differing paths, speeds, and locations of the designated trailing vehicle relative to the leading vehicle.

In an example, the present subject matter provides a solution to these problems, such as by using one or more of location, speed, or heading information corresponding to a leading vehicle in an implement train to determine a location of one or more points, or fiducials, on a trailing vehicle in the implement train. In an example, the present subject matter includes identifying an initial location and a destination location of a trailing vehicle, and determining an orientation (i.e., direction, or heading) of the trailing vehicle at the destination location. The orientation of the trailing vehicle at the destination location is based on information about the trailing vehicle at an intermediate location between the initial and destination locations, and the intermediate location is determined based on a portion of the linear distance between the initial and destination locations. In some examples, the present subject matter includes determining one or more of a location or heading of one or more implements (e.g., row units, planter units, fertilizer units, or the like) associated with a designated trailing vehicle (e.g., carts, wagons, or the like), and controlling a function of the one or more implements based on one or more of the determined location or heading. In some examples, the present subject matter includes determining locations and/or headings of multiple trailing vehicles and respective multiple implements associated with those vehicles.

The present subject matter is configured to use information from a positioning or navigation system for a leading vehicle (e.g., tractor, tank, truck, tractor trailer, or the like) to determine location or heading information about trailing vehicles of an implement train. The trailing vehicles do not require designated, separate positioning or navigation systems, accelerometers, or speed sensors. Instead, a control module in communication with a single vehicle positioning or navigation system (e.g., coupled to the leading vehicle) can maintain dimensional and configuration information about the trailing vehicles and their respective implements (e.g., including information about trailing vehicle axle type or location, hitch and tongue length, such as relative to an axle, pivot locations, and the like). Accordingly, using information about the position of the leading vehicle, the control module can determine one or more of a location or heading of any trailing vehicle, and using information about the configuration and dimensions of the trailing vehicles or implements, the control module can determine or one or more of a location or heading of any point on a trailing vehicle, such as any point corresponding to an implement.

While the systems and methods described herein are often discussed in the context of an agricultural implement train, the systems and methods can be applied to other implement trains that include a leading vehicle coupled to one or more trailing vehicles, such as including, but not limited to, trucks and trailers, cargo hauling arrangements, marine hauling arrangements, and the like.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

The disclosure may be more completely understood in consideration of the following detailed description of various embodiments of the disclosure in connection with the accompanying drawings, which are as follows.

DETAILED DESCRIPTION

Figure 1A:
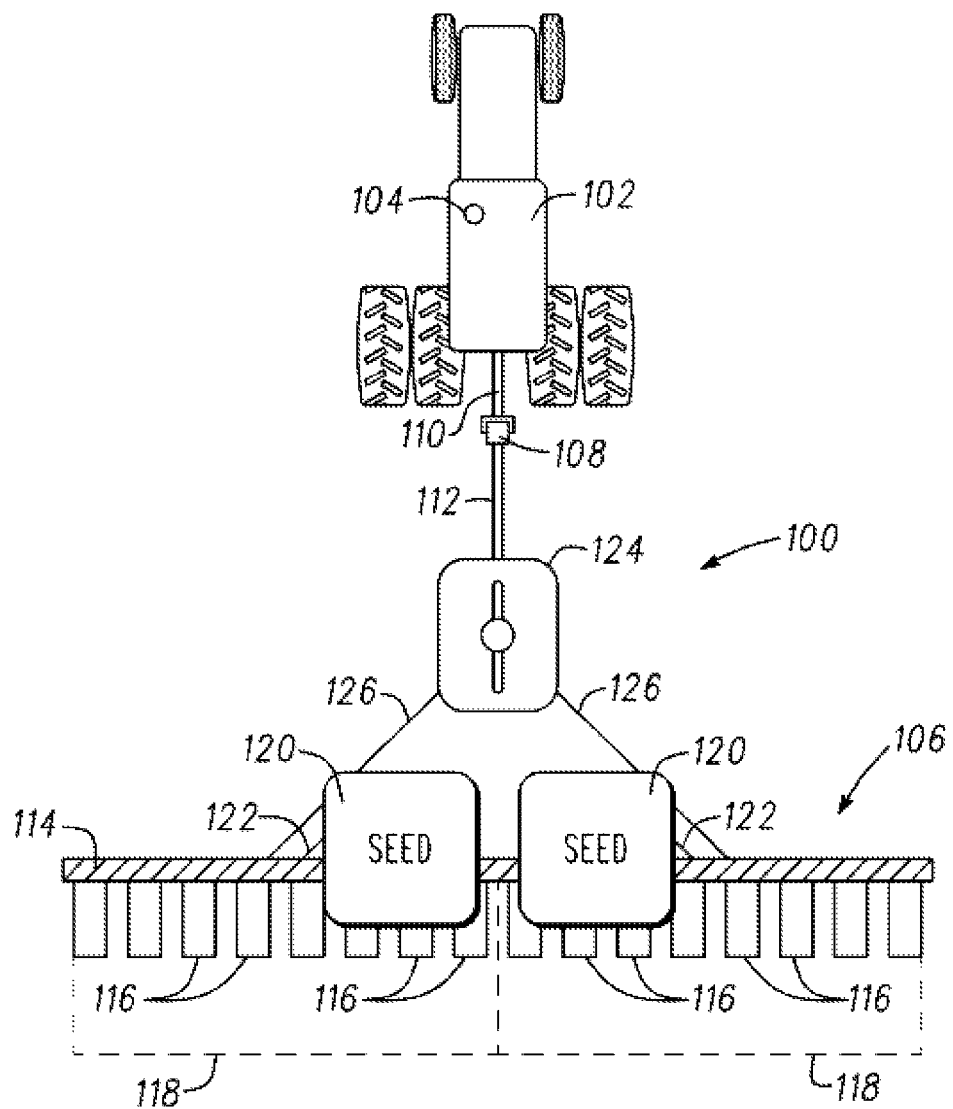
FIG. 1A is a schematic view of an example of an implement train including a leading vehicle and a trailing vehicle.

FIG. 1A illustrates an implement train 100 comprising a leading vehicle 102 (e.g., a tractor or the like), with a navigation system sensor 104, such as a GPS antenna, mounted thereon. The leading vehicle 102 is operatively hitched to a trailing vehicle 106 by way of an articulating joint 108 that couples a rear hitch 110 of the leading vehicle 102 with a tongue 112, or front hitch, of the trailing vehicle 106. In an example, the present disclosure provides systems and methods that include a position-determining algorithm and a speed-determining algorithm. The position-determining algorithm uses information from the navigation system sensor 104 to identify one or more locations or headings associated with implements on the trailing vehicle. The speed-determining algorithm uses information about the trailing vehicle position to identify the speeds of the one or more implements, for example while the trailing vehicle is pulled by the leading vehicle along a curved path.

The algorithms described herein model vehicles in the implement train as two-wheeled vehicles. Each vehicle includes any number of wheels along a transverse axle, and a tongue or front hitch that extends forward, perpendicular to the axle, and is attachable to a rear hitch of a vehicle ahead. Generally, each vehicle is characterized by, among other things, (1) a tongue length, which can be negative in cases where the tongue is behind the axle in the direction of movement; (2) a hitch length, which can be negative in cases where the hitch is ahead of the axle; (3) a position of the hitch or an implement along the axle of the vehicle; and (4) whether the vehicle is the rear portion of a steered wagon (i.e., a vehicle with rear wheels steerable in a direction opposite the front wheels). As further discussed below at FIGS. 3A and 3B, some vehicles include a two-wheel cart with fixed rear wheels, a four-wheel wagon with steered front wheels and fixed rear wheels, a four-wheel wagon with steered rear wheels, a conventional tractor with fixed rear wheels (e.g., whose "tongue" is hitched to an effective position of a position sensor, such as a GPS receiver), or a tracked vehicle (i.e., a vehicle with continuous treads).

In some examples, implement trains are guided, and row units (e.g., implements) are controlled, using position sensors, such as including GPS receivers. However, in other examples, trailing vehicles coupled to the leading vehicle do not include GPS receivers, and their location, speed, and direction, may not be known or are difficult to determine without position or GPS instrumentation on the trailing vehicle. In an example, the position-determining algorithm is applied based on information about a location of the leading vehicle and information about relative dimensions of the leading vehicle and one or more fiducials of interest, such as to determine a location, speed, or heading, of one or more trailing vehicles, including one or more implements (e.g., row units) coupled to the one or more trailing vehicles. In some examples, trailing vehicles include one or more toolbars (or sprayer booms, or other attachments) that span a width of a trailing vehicle and include a plurality of row unit dispensing devices. The plurality of row unit dispensing devices distributed along the width further complicates accurate guidance and control of the devices as each is spaced differently along the vehicle. The systems and methods described herein consider such spacings to provide accurate location, speed, and heading information.

In the example of FIG. 1A, the trailing vehicle 106 (e.g., a vehicle comprising one or more agricultural implements) includes, but is not limited to, a toolbar 114 adapted to deliver one or more of granular or liquid products, such as seed, fertilizer, chemicals, and the like. The trailing vehicle 106 includes multiple row units 116 positioned and spaced apart along the width of the toolbar 114. The row units 116 are optionally product dispensers configured to dispense granular or liquid products as the implement train traverses a field. The toolbar 114 and the row units 116 are illustrated with broken line brackets as comprising right and left sides 118. In one example, the left and right sides 118 are individually controllable. In another example, each of the row units 116 is individually controllable.

As shown in FIG. 1A, one or more seed containers 120 are mounted on the trailing vehicle 106 and are in operative connection with the row units through a seed supply line 122. A fertilizer container 124 is operatively connected to one or more of the row units 116 by fertilizer supply lines 126. The implement train 100 is shown in this example with a single trailing vehicle 106. In other examples provided herein, the implement train 100 includes more than one trailing vehicle operatively hitched as a train through couplings at articulated joints between respective hitches and tongues.

A frequent example throughout this document includes a tractor as a leading vehicle that is coupled to one or more trailing vehicles with implements (e.g., agricultural implements). However, the systems and methods of the present disclosure are similarly applicable in any vehicle train that includes a leading vehicle (e.g., powered or unpowered) and a trailing vehicle that is coupled with the leading vehicle using an articulating joint, such as wherever there is benefit in accurately determining location, speed, or heading information about the trailing vehicle. Characteristics such as a location, speed, or heading (i.e., direction, or bearing) of the leading vehicle are used to determine a location, speed, or heading of a trailing vehicle (e.g., a plurality of separate locations or fiducials of the trailing vehicle) and, where applicable, these characteristics are used to control one or more implements associated with the trailing vehicle. The various examples and embodiments presented herein, as well as their equivalents or alternatives, are usable in a variety of applications including, but not limited to, trucks and trailers, cargo hauling arrangements, marine hauling arrangements, military applications including multiple vehicle trains, and the like.

Accurate product placement using such implement trains is often difficult to achieve. The articulating joints between adjacent vehicles in the implement train, such as the articulating joint 108, curved driving paths, and the like, present a combination of discrete vehicles traveling in an often non-linear and difficult to predict fashion. Optionally, navigation sensors, such as GPS receivers placed on one or more of the trailing vehicles are used to identify trailing vehicle location, and that location information is used to adjust a function of an implement on a trailing vehicle. However, the installation and duplication of GPS antennas on multiple vehicles or implements is labor intensive and expensive. The present disclosure addresses this problem by providing systems and methods for generating accurate location, heading, and speed information about any number of points, or fiducials, on a trailing vehicle using information about a leading vehicle fiducial location. For example, the present disclosure includes systems, methods, and machine-readable media comprising instructions for using location information about a leading vehicle to determine location, heading, or speed information about one or more trailing vehicles, and optionally to determine location, heading, or speed information about any number of implements or other points of interest on the trailing vehicles. Dimensional characteristics of the implement train 100, such as between each of two or more locations of interest along the train (e.g., hitch points, joints, implement locations and the like) are used to propagate information about a first implement position through the implement train 100.

In an example, GPS receivers corresponding to trailing vehicles or row units, and real-time information about a trailing vehicle location, direction, and the like, are not needed. That is, dedicated GPS receivers or other position or speed sensors for a trailing vehicle are not needed to accurately determine a location of one or more fiducials associated with a trailing vehicle. Instead, location information about a leading vehicle, such as obtained using a single position sensor (e.g., a GPS receiver) coupled to the leading vehicle, is used to determine a location, heading, or speed of one or more fiducials on trailing vehicles that are coupled to the leading vehicle using articulating joints.

Figure 1B:
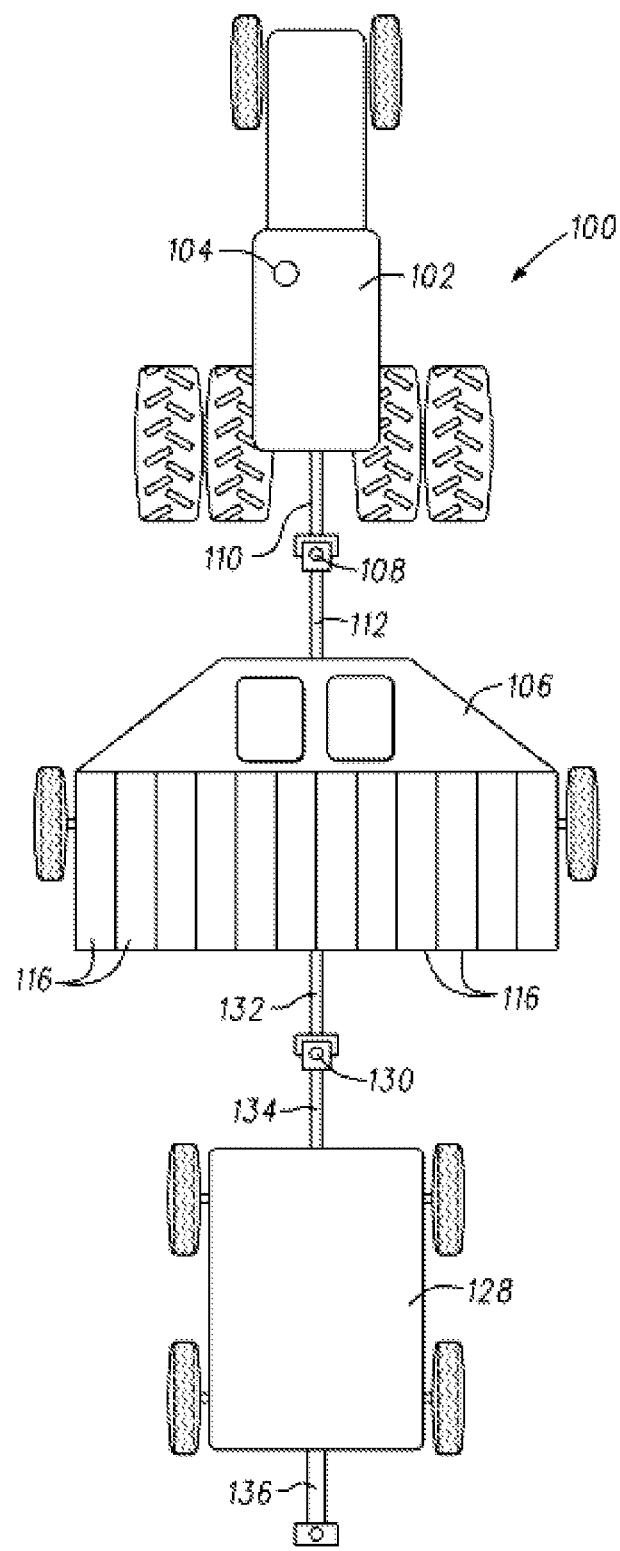
FIG. 1B is a schematic view of an example of an implement train including a leading vehicle and multiple trailing vehicles.

FIG. 1B shows an example of the implement train 100 with multiple trailing vehicles, including the first trailing vehicle 106 and a second trailing vehicle 128. In this example, the first trailing vehicle 106 includes a first trailing vehicle rear hitch 132 coupled with a second trailing vehicle tongue 134 (e.g., a second trailing vehicle front hitch) at an articulating joint 130. The first trailing vehicle 106 includes the first trailing vehicle tongue 112, which is coupled with the rear hitch 110 of the leading vehicle 102 at the articulating joint 108. Additionally, in the example of FIG. 1B, the second trailing vehicle 128 includes a second trailing vehicle rear hitch 136 that is optionally connected to a third trailing vehicle, such as using an articulating joint.

In an example, the implement train 100 includes a tractor as the leading vehicle 102, and an agricultural implement as the first trailing vehicle 106, such as described above in the example of FIG. 1A. Third, fourth, or other additional vehicles are optionally similarly coupled to the implement train 100, and any one or more of the vehicles is optionally adapted to perform a function, such as to deliver one or more products (e.g., seed, fertilizer, etc.) using agricultural row units disposed on the vehicles. As described above, the leading vehicle 102 optionally includes a navigation system sensor 104, such as a GPS receiver used to determine, among other things, a location, heading, and speed of the leading vehicle 102.

In an example, the position-determining algorithm is applied to determine location or heading information about fiducials on each of the first and second trailing vehicles 106, 128. Location or heading information is determined for fiducials on the first trailing vehicle 106 using information about the location of the leading vehicle 102. Similarly, location or heading information is determined for fiducials on the second trailing vehicle 128 using information about the location of the first trailing vehicle 106. That is, the first trailing vehicle 106 is considered to "lead" the second trailing vehicle 128 and is the effective leading vehicle relative to the second trailing vehicle 128. Dimensional characteristics of the implement train 100, such as between two or more locations of interest along the train (e.g., hitch points, axles, row units, joints, and the like), are used to propagate location information through the implement train 100.

Figure 2:
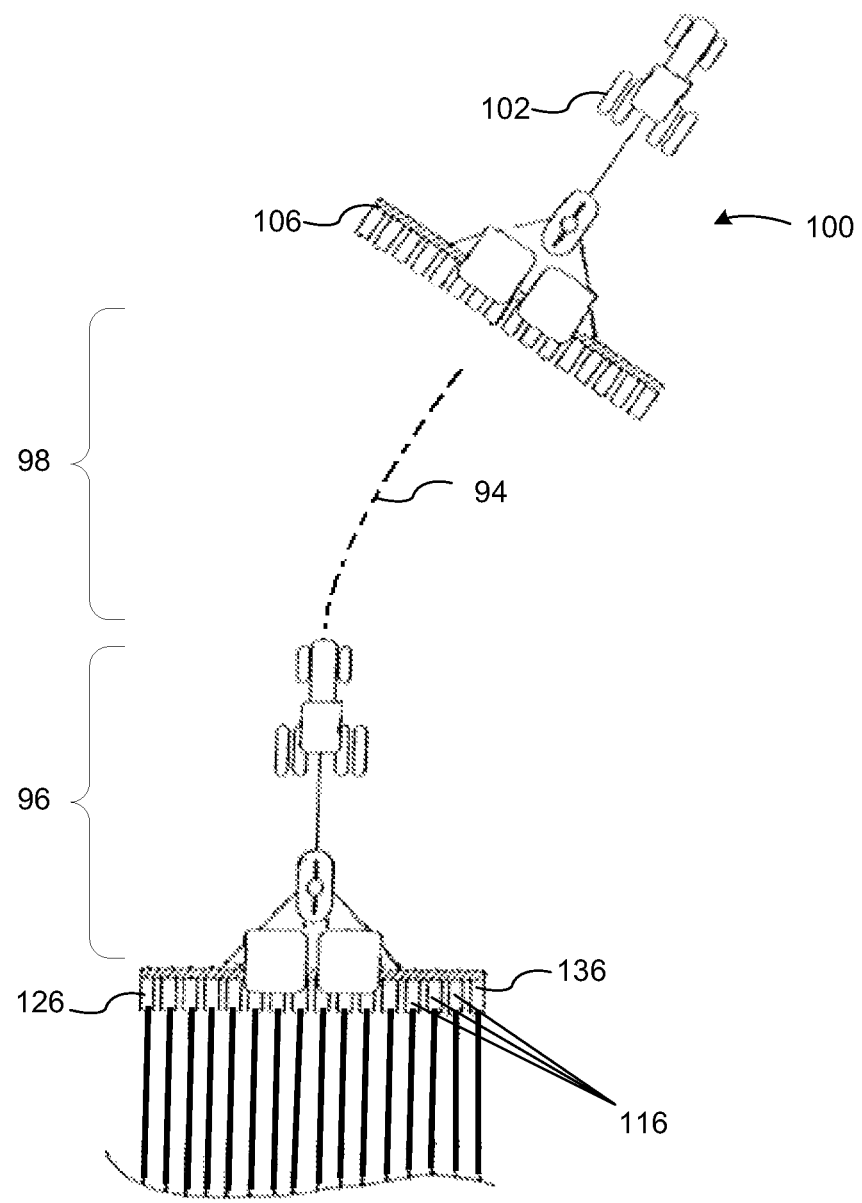
FIG. 2 is a schematic view of an implement train that includes a trailing vehicle following a curved path.

FIG. 2 illustrates generally an example of the implement train 100 in the context of an agricultural field environment. In the example of FIG. 2, the leading vehicle 102 pulls the first trailing vehicle 106 along a pathway 94 including a substantially straight portion 96 and a curved portion 98. As will be described herein, a method for controlling an implement on the first trailing vehicle 106 (e.g., the row units 116), through determining the location, heading, or speed of the leading vehicle 102, allows for individual management of each implement, such as without dedicated GPS, accelerometer, ground speed sensors, or other sensors at each of the implements of the vehicle. That is, in the case of an agricultural system where the implements are agricultural row units 116, location, heading, and speed information about each of the row units 116 is accurately determined, such as using information about a location, speed, or heading, of the leading vehicle 102 (e.g., a tractor). With information about the location, speed, or heading of the row units 116, each unit is controllable to accurately perform tasks associated with the row units 116, for example, seeding or fertilizing a particular ground space at a particular rate, or inhibiting seeding or fertilizing the ground space. Without the method described herein, row units would apply agricultural products according to the gross control provided by vehicle-wide control systems (mechanical shafts, central controllers, and the like) or require the implementation of multiple individual controllers for many (or all) of the row units for finer control.

Agricultural fields are often irregular in contour and shape and include navigational challenges such as curves, tree lines, hillsides, streams, and the like. In the example of FIG. 2, as the first trailing vehicle 106 is pulled along the curved portion 98 of the pathway 94, each of the row units 116 traverses the curved portion 98 at a different rate. For instance, a first row unit 136 traversing an inner portion of the curve moves at a slower speed than a second row unit 126 traversing an outer radius portion of the curve. In tight turn situations, one or more of the innermost row unit dispensing devices may move in reverse. Without accurately compensating for such differences in velocity or travel direction, dispensed agricultural products are released at sub-optimal rates, for example by lower than optimal rates by outer row unit dispensing devices, and at higher than optimal rates by inner row unit dispensing devices. In one example, only the centermost row unit dispensing devices delivers the agricultural product at a proper and optimal rate. Variation from the optimal rate of dispensing at one or more row units 116 leads to non-uniform seed, fertilizer or other product distribution across a field. These problems are often compounded if more than one trailing agricultural implement is used in an implement train.

Figure 3A:
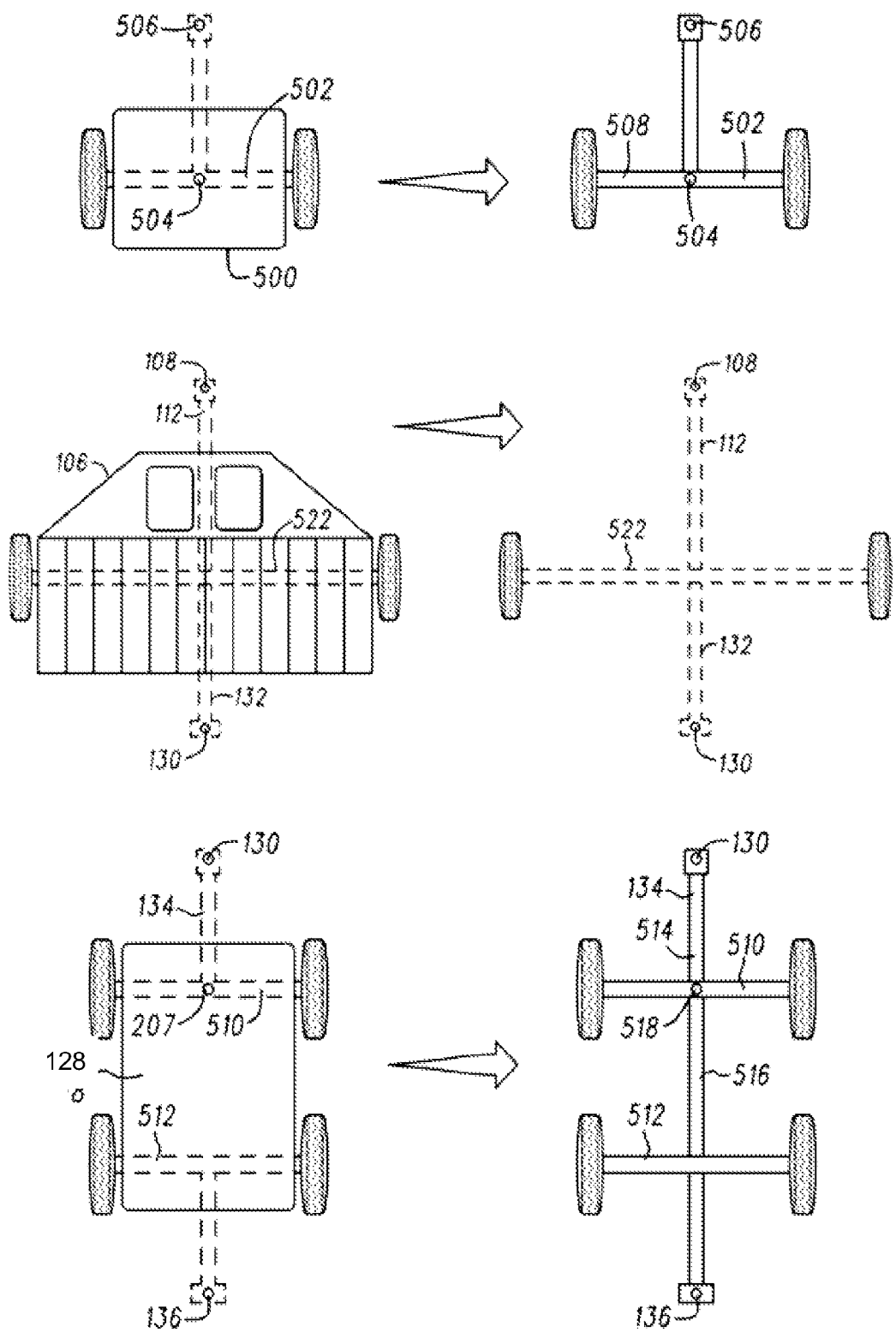
FIG. 3A is a schematic view showing exemplary decompositions of a plurality of trailing vehicles of an implement train.

FIG. 3A shows a series of trailing vehicles including the trailing vehicles 500, 128 and 106 (trailing vehicle 106 was previously described and shown in FIGS. 1A and 1B). FIG. 3A decomposes each of these trailing vehicles into respective component vehicles for use in the algorithms described herein. Each of the one or more vehicles is decomposed into component vehicles having respective axes and front and rear hitch locations.

For instance, in the first example that includes the trailing vehicle 500, the vehicle includes an axle 502 and rear and front hitch locations 504, 506 respectively. The rear and front hitch locations 504, 506 are shown at either end of a tongue that extends from the axle 502. In the view to the right of the non-decomposed vehicle 500, the decomposed vehicle, or component vehicle 508, is shown, corresponding to the trailing vehicle 500. The component vehicle 508 includes the axle 502 as well as rear and front hitches 504, 506.

In a similar manner, the trailing vehicle 106 (previously shown in FIGS. 1A and 1B) is decomposed in FIG. 3A. For instance, the trailing vehicle 106 includes front and rear hitches corresponding to the articulating joints 108, 130, or couplings for articulating joints with the other components of the implement train 100. As shown in FIG. 3A, the decomposed component vehicle further includes a corresponding tongue 112 with the front hitch articulating joint 108 near an end of the tongue 112 away from the axle 522. The rear hitch articulating joint 130 is positioned near an end of the rear hitch 132 away from the axle 522.

An example of a trailing vehicle 128 is also provided in FIG. 3A. The trailing vehicle 128 is decomposed into first and second components vehicles 514 and 516. For instance, the first and second component vehicles 514, 516 correspond to virtual representations of separate vehicles coupled together at the pivot point 207 for the axle 510. As shown in the view on the right, the first component vehicle 514 includes the front axle 510 and the articulating joint 130 (component front hitch location) of the trailing vehicle 128 as well as a component rear hitch location 518 corresponding to the position of the pivot point 207 of the axle 510. The second component vehicle 516 of the decomposed trailing vehicle 128 includes a component front hitch location 520 corresponding to the location of the pivot point 207 of the front axle 510 of the first component vehicle 514. Similarly the second component vehicle 516 includes the rear hitch location 136 (the component rear hitch location of the component vehicle 516) spaced from the rear axle 512 of the second component vehicle 516. The trailing vehicle 128 is thereby decomposed into first and second component vehicles 514, 516 configured for coupling and articulation at the pivot point 207 of the trailing vehicle 128 corresponding to an articulating joint between the first and second component vehicles 514, 516.

Based on the exemplary decompositions shown in FIG. 3A, an implement train including any variety of trailing vehicles may be decomposed into separate component vehicles coupled at articulating joints corresponding to one or more pivoting axes or articulating joints of the respective trailing vehicles to thereby facilitate the determination of location, speed, and heading, of one or more fiducials associated with the trailing vehicles.

Figure 3B:
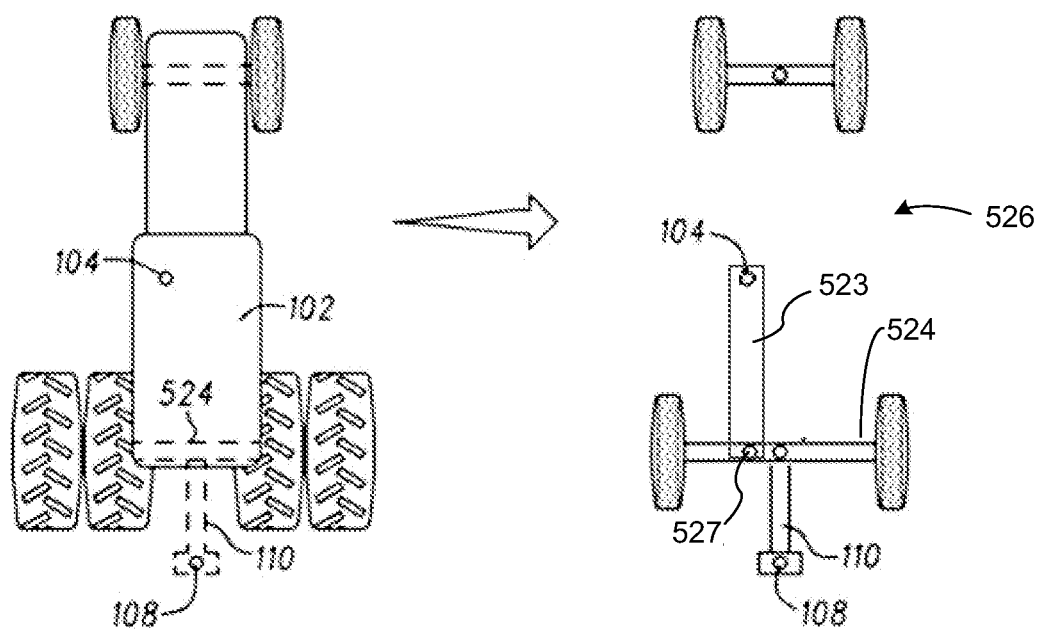
FIG. 3B is a schematic view showing an exemplary decomposition of a leading vehicle of an implement train.

Referring now to FIG. 3B, the leading vehicle 102 (e.g., a tractor) is shown in a decomposed format. As previously described, the leading vehicle 102 includes a rear hitch 110 including a coupling for the articulating joint 108 between the leading vehicle 102 and a trailing vehicle. In one example, the articulating joint 108 corresponds to a rear hitch location of the leading vehicle 102. As further shown in FIG. 3B and previously described herein, the leading vehicle 102 further includes a navigation system sensor 104, for instance a GPS antenna positioned on the leading vehicle 102 (a virtual front hitch location). The right view of FIG. 3B shows the decomposed leading vehicle 526.

The component decomposed leading vehicle 526 includes an axle 524 and a virtual front hitch 523. The rear hitch 110 is shown extending from a central position on the axle 524. The location of the virtual front hitch 523 corresponds to a line perpendicular to the axle 524 and intersecting with the location of the navigation system sensor 104. The leading vehicle is considered to be pulled, perpendicular to the axle 524, at the location of the navigation system sensor 104. In the example of FIG. 3B, the leading vehicle is considered to be pulled at the location 527, a location on the axle 524 that is offset from the center of the axle and the rear hitch 110. In this example, the rear hitch 110 and the articulating joint 108 are treated as if they are offset from the point from which the leading vehicle is considered to be pulled, that is, the location 527. With the arrangement shown in FIG. 3B, the component leading vehicle 526 provides a decomposed view that spaces the virtual front hitch 523 (e.g., corresponding to the navigation system sensor 104) from the rear hitch location corresponding to the articulating joint 108 by a predictable and set distance. In another example, the navigation system sensor 104 is positioned substantially anywhere on the leading vehicle 102. Accordingly, the navigation system sensor 104 (the front hitch location) in such an example would include a virtual bar or other virtual element extending perpendicularly from the axle 524 to the navigation system sensor 104. In some examples, the navigation system sensor 104 is positioned along the central axis of the rear hitch 110 perpendicular to the axle 524. In this case, the rear hitch 110 and the articulating joint 108 need not be treated as offset.

Figure 4:
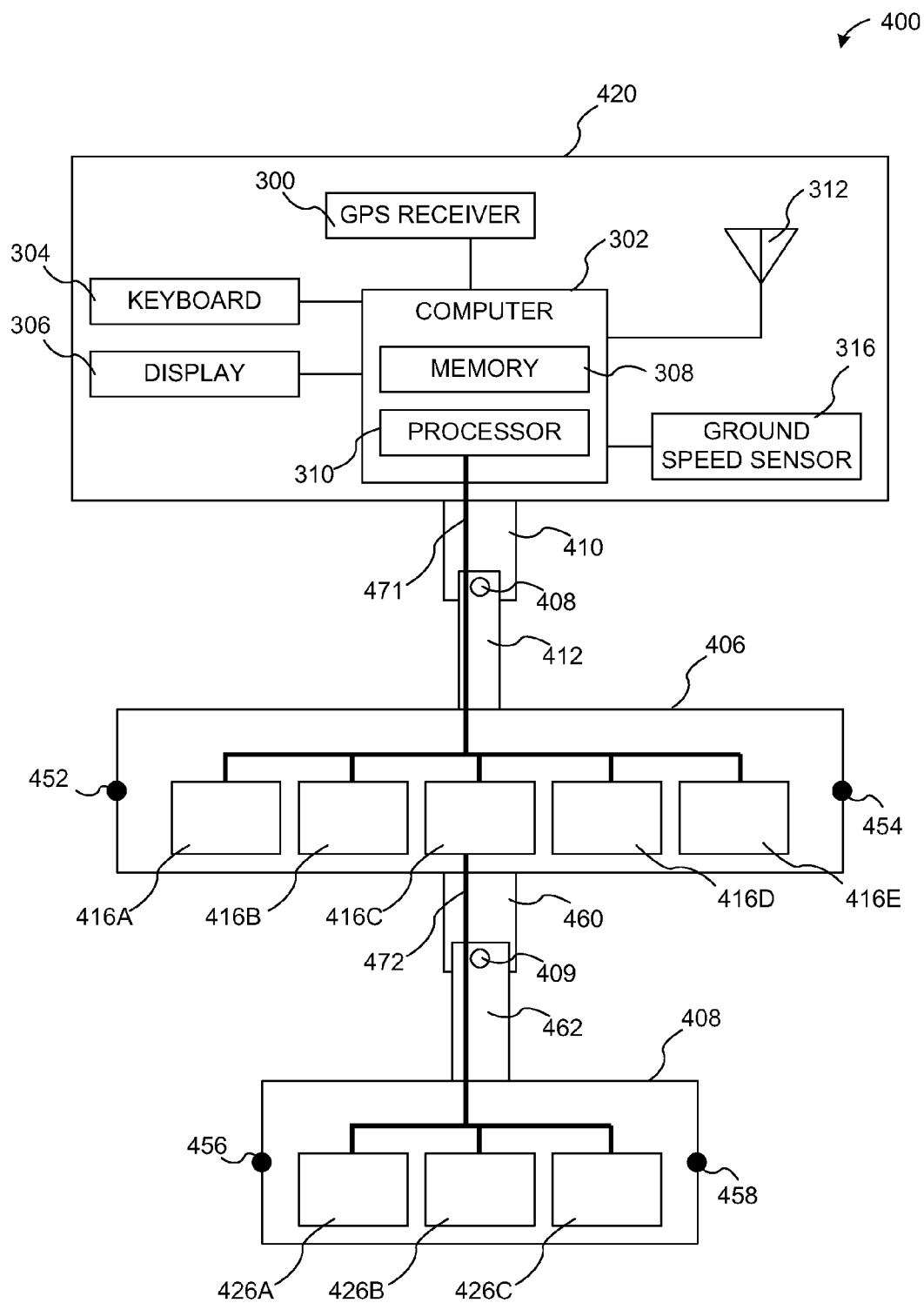
FIG. 4 is a schematic view of an example of a leading vehicle control module coupled to an implement train.

Turning now to FIG. 4, various portions of an implement train 400 are shown in schematic form. The implement train 400 includes a leading vehicle 420, a first trailing vehicle 406, and a second trailing vehicle 408. The leading vehicle 420 includes various control and interface modules, including one or more of a field computer 302, a controller 314, a GPS receiver 300, and a ground speed sensor 316, among other components.

In an example, the field computer 302 is positioned on the leading vehicle 420. The field computer 302 includes a memory circuit 308 and a processor circuit 310, and the field computer 302 is optionally coupled to a keyboard 304 and a display device 306 (e.g., a touch-screen display device available to an operator of the leading vehicle 420). The memory circuit 308 includes a massed machine readable medium, and the processor circuit 310 is in data communication with the memory circuit 308 and is configurable to execute one or more instructions stored by the machine readable medium. In an example, a massed machine readable medium comprises a machine readable medium with a plurality of particles having resting mass. Non-limiting machine readable medium examples include solid-state memories, and optical and magnetic media. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, the field computer 302 is optionally in data communication with a wireless transceiver 312, such as is used to wirelessly communicate with one or more other devices using a wireless RF signal. In an example, the processor circuit 310 includes a data output configured to communicate with one or more implements on the implement train, such as wirelessly using the wireless transceiver 312, or using an optional wired connection 471. For instance, the processor circuit 310 wirelessly communicates instructions to a row unit on a vehicle in the implement train 400, such as unit-specific instructions for product selection, dispensing rate, or the like.

In the example of FIG. 4, the leading vehicle 420 is operatively hitched to the first trailing vehicle 406 by way of a first articulating joint 408 that couples a rear hitch 410 of the leading vehicle 420 with a tongue 412 (i.e., front hitch) of the first trailing vehicle 406. The first trailing vehicle 406 includes multiple row units, including exemplary first, second, third, fourth, and fifth row units 416A, 416B, 416C, 416D, and 416E. In other examples, the trailing vehicle includes, but is not limited to, a plurality of row units, for instance 16, 32 or more row units. The first trailing vehicle 406 is coupled to the second trailing vehicle 408 by way of a second articulating joint 409 that couples a rear hitch 460 of the first trailing vehicle 406 with a tongue 462 of the second trailing vehicle 408. Fewer or additional row units are optionally included on a given trailing vehicle. The second trailing vehicle 408 includes multiple row units, including exemplary first, second, and third row units 426A, 426B, and 426C, that are optionally different from or the same as those on the first trailing vehicle 406. For example, the row units 416A, 416B, etc., on the first trailing vehicle 406 include planter row units, and the row units 426A, 426B, and 426C include fertilizer dispenser row units. Additional trailing vehicles are optionally subsequently coupled to the second trailing vehicle 408, such as by way of respective articulating joints. In the example of FIG. 4, two trailing vehicles are shown for brevity.

In an example, the row units 416A, 416B, etc., and 426A, 426B, etc. are communicatively coupled with the field computer 302, such as using a transmission line. A transmission line optionally includes a physical medium (e.g., CAT V copper wire), or a wireless connection between the row units and the field computer 302, such as via the wireless transceiver 312. In an example, a first transmission line 471 physically couples the field computer 302 to the row units on the first trailing vehicle 406, and a second transmission line 472 physically couples the field computer 302 to the row units on the second trailing vehicle 408. The transmission lines are bidirectional and carry data, including control signals and performance and diagnostic information, to or from the field computer 302 and the various row units. For example, the transmission line carries data signals, including control signals issued by the field computer 302 to the row units to control a dispensing rate of an agricultural product by a particular unit, and the transmission line carries data signals that include device status information from the row units to the field computer 302. In an example, a row unit on the first trailing vehicle uses the transmission line 471 to receive an inquiry from the field computer 302 about a seed inventory and provide a responsive data signal to the field computer 302 that includes, among other things, information about a type or quantity of seed available to the row unit.

Information about relative locations of the row units on the first trailing vehicle 406 are optionally stored in the memory circuit 308. In an example, the memory circuit 308 includes stored data representing one or more dimensions corresponding to the implement train 400 including, but not limited to, information about a tongue length, or information about a distance from the first articulating joint 408 to one or more fiducials of interest on the first trailing vehicle 406. Fiducials of interest include points on the first trailing vehicle 406 corresponding to one of the row units 416A, 416B, etc. In an example, the memory circuit 308 further includes stored data representing one or more dimensions corresponding to the leading vehicle 420 including, but not limited to, information about a distance from a GPS antenna (e.g., coupled to the GPS receiver 300) to a center line of the leading vehicle 420, information about a distance from the GPS antenna to the first articulating joint 408, and the like. In an example, the memory circuit 308 includes stored data representing other distances, such as distances from the second articulating joint 409 to one or more fiducials of interest on the second trailing vehicle 408.

In an example, the memory circuit 308 includes stored data representing information about a transverse width of each trailing vehicle (e.g., about a width of a toolbar or spray boom) in the implement train 400, such as including information about first and second endpoints 452, 454 corresponding to the side ends of the first trailing vehicle 406, and information about third and fourth endpoints 456, 458 corresponding to the side ends of the second trailing vehicle 408. In an example, the memory circuit 308 includes data that represents distances of each of the row units 416A, 416B, etc., on the first trailing vehicle 406 from one or both of the first and second endpoints 452, 454, as well as a distance between adjacent row units. Optionally, one or more of these data items are manually entered into the memory circuit 308 by way of the keyboard 304, or wirelessly by an external device configured to communicate with the memory circuit 308 using the wireless transceiver 312, among other ways.

In the example of FIG. 4, the field computer 302 is illustrated as being on-board the leading vehicle 420. In other examples, the field computer 302, or portions thereof, is provided in other locations. For instance, a processing module carried by the leading vehicle 420 is optionally configured to interpret results of the position-determining algorithm and provide location information to various implements in an implement train, and an external module, such as remote from the leading vehicle 420, is configured to perform the position-determining algorithm and communicate the results to the processing module on the leading vehicle 420. Any permutation of the various components of the leading vehicle 420, such as provided at one or more locations (centralized or decentralized), are within the scope of the present disclosure.

In an example, the field computer 302 receives or determines latitude and longitude coordinates, or other coordinate-based location information, such as using a global positioning system (e.g., using information received using the GPS receiver 300). Optionally, this information is used together with a Real Time Kinematic (RTK) vehicle correction signal, such as received by the field computer 302 using the wireless transceiver 312. In an example, the field computer 302 determines a location, speed, or heading, of each implement in an implement train. This information is useable in coordination with a field map, such as together with additional data stored in the memory circuit 308 (e.g., data about dimensions of the various features or components of the implement train 400) to control dispensing of agricultural products. For example, row unit location, speed, or heading information corresponding to a particular row unit is used to control a rate at which the row unit dispenses a product, or a type of product dispensed by the row unit, or the like.

In an example, a row unit includes a unit-specific control mechanism configured to operate according to instructions from the field computer 302, such as including instructions to power a unit on or off, or to change a rate of seed dispensing, liquid or granular fertilizer application, or the like. In some examples, the unit-specific control mechanism is in operative communication with a seed variety selector, a fluid valve, such as configured to meter a liquid fertilizer, or with a seed tube monitor, such as configured to monitor seed output of a row unit (e.g., using an optical or mechanical sensor in a seed tube).

The various systems described above are included in the implement train 400 and are used to initiate or inhibit one or more processes in a row unit, such as depending on a determined speed, location, or heading of the row unit. Such tailored control improves system efficiency and reduce costs, such as by preventing overlap of products dispensed, or by precisely adjusting a row unit output consistent with circumstances of the available terrain (e.g., to compensate for various non-linear portions of a travel path of an implement train, or to compensate for various features in the terrain itself, such as by identifying and automatically responding to portions of a terrain that may not be suitable for seeding and/or spraying). In an example, a row unit is suspended from dispensing seed or fertilizer if its control mechanism determines (e.g., by way of instructions received from the field computer 302) that an area presently available to the row unit for seeding or fertilizing was previously seeded or fertilized.

In an example, one or more of a pre-programmed computerized field map or RTK-corrected GPS coordinates are used to indicate regions of a field that are to be or not to be seeded or fertilized (and optionally at what rate). As a subset of available row units (e.g., a subset of the row units 416A, 416B, etc., 426A, 426B, etc.) pass over these regions, one or more functions of the row units are inhibited or initiated, such as to prevent or provide seed or fertilizer.

In an example, a trailing vehicle is pulled along a curved path, and implements on the trailing vehicle that follow an inner radius of the path have a slower ground speed relative to one or more other row units on an outer radius of the curve (i.e., row units on an implement boom will have greater or lesser ground speed as they travel around curves according to their location along the boom relative to the radius of a curve). The systems and methods described herein identify these different speeds, and accordingly adjust a function of one or more of the row units.

Figure 5A:
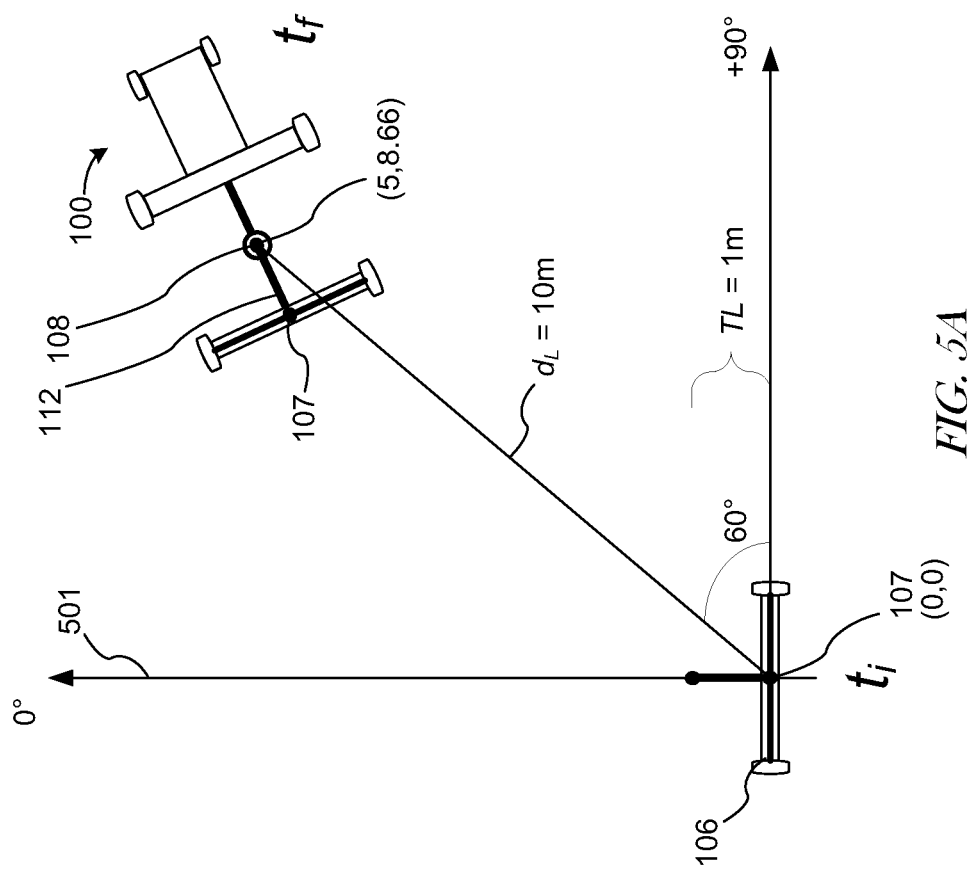
FIG. 5A is an example illustrating generally a portion of a position-determining algorithm.

Turning now to FIG. 5A, an example illustrates the position-determining algorithm. In the example, the implement train 100 is illustrated on a plane 501, such as a Cartesian plane. The trailing vehicle 106 is illustrated at an initial location corresponding to an initial time $t_i$, and at a destination location, where the trailing vehicle 106 is shown coupled with a leading vehicle, corresponding to a final time $t_f$. In the example of FIG. 5A, the first trailing vehicle 106 is a single axle vehicle, such as having wheels on opposite ends along a transverse axle of the vehicle. The first trailing vehicle 106 is shown with an axle fiducial 107 positioned at the origin of the plane 501. The axle fiducial 107 corresponds to an intersection of an axis of the axle of the first trailing vehicle 106 and an axis of the tongue 112.

The position-determining algorithm includes identifying a linear distance between initial and destination locations, identifying an intermediate distance, and identifying a heading of a trailing vehicle when the trailing vehicle coincides with the destination location. That is, without using continuous or even rapidly-sampled position information about the trailing vehicle, its location and heading is identified when the trailing vehicle reaches its destination.

In the example of FIG. 5A, the position-determining algorithm begins by identifying the initial and destination locations. For example, a first location corresponding to the axle fiducial 107 at time $t_i$ is identified, a second location corresponding to the articulating joint 108 (i.e., the coupling between the leading vehicle 102 and the first trailing vehicle 107) at time $t_f$ is identified. A linear distance (i.e., the shortest distance $d_L$) between the first and second locations is then determined. In the example 500, the initial location is (0,0), the destination location is (5,8.66), and the linear distance is thus 10 meters. In an example, the initial and destination locations are known on a Cartesian plane, and the linear distance is calculated as the shortest distance between the locations (e.g., using a root-sum-square technique).

In an example, if the heading of the first trailing vehicle 106 is known at time $t_i$, identifying the first location alternatively includes identifying the location of the articulating joint 108 at time $t_i$. Using the known heading, the location of the articulating joint 108 at time $t_i$, the length of the tongue 112 TL (e.g., the shortest distance from the articulating joint 108 to the axle of the first trailing vehicle 106), the first location corresponding to the axle fiducial 107 is determinable. For example, if the heading of the first trailing vehicle 106 at time t, is 0° (e.g., due north), the location of the articulating joint 108 at time t, is (0,1) in the plane 501, and the length of the tongue 112 is TL=1 m, then the first location corresponding to the axle fiducial 107 is (0,0).

The position-determining algorithm continues by determining an intermediate location for the first trailing vehicle 106 between the initial location and the destination location. The intermediate location need not coincide with an actual location of the trailing vehicle along the curved path between the initial and destination locations. Instead, the intermediate location is considered to be a virtual location of the trailing vehicle that is used to determine the heading of the trailing vehicle when the trailing vehicle reaches the destination location. The intermediate location is in the direction of the heading of the first trailing vehicle 106 at time $t_i$. That is, the intermediate location is a location ahead, or in front, of the first trailing vehicle 106 in the direction that the first trailing vehicle 106 is headed at time $t_i$. For example, if the heading of the first trailing vehicle 106 at time $t_i$ is 0°, and the location of the articulating joint 108 at time $t_i$ is (0,1) in the plane 501, then the intermediate location corresponds to a location along the line x=0. In another example, if the heading of the first trailing vehicle 106 at time $t_i$ is 90° (e.g., due east), and the location of the articulating joint 108 at time $t_i$ is (0,1) in the plane 501, then the intermediate location corresponds to a location along the line y=1.

Figure 5B:
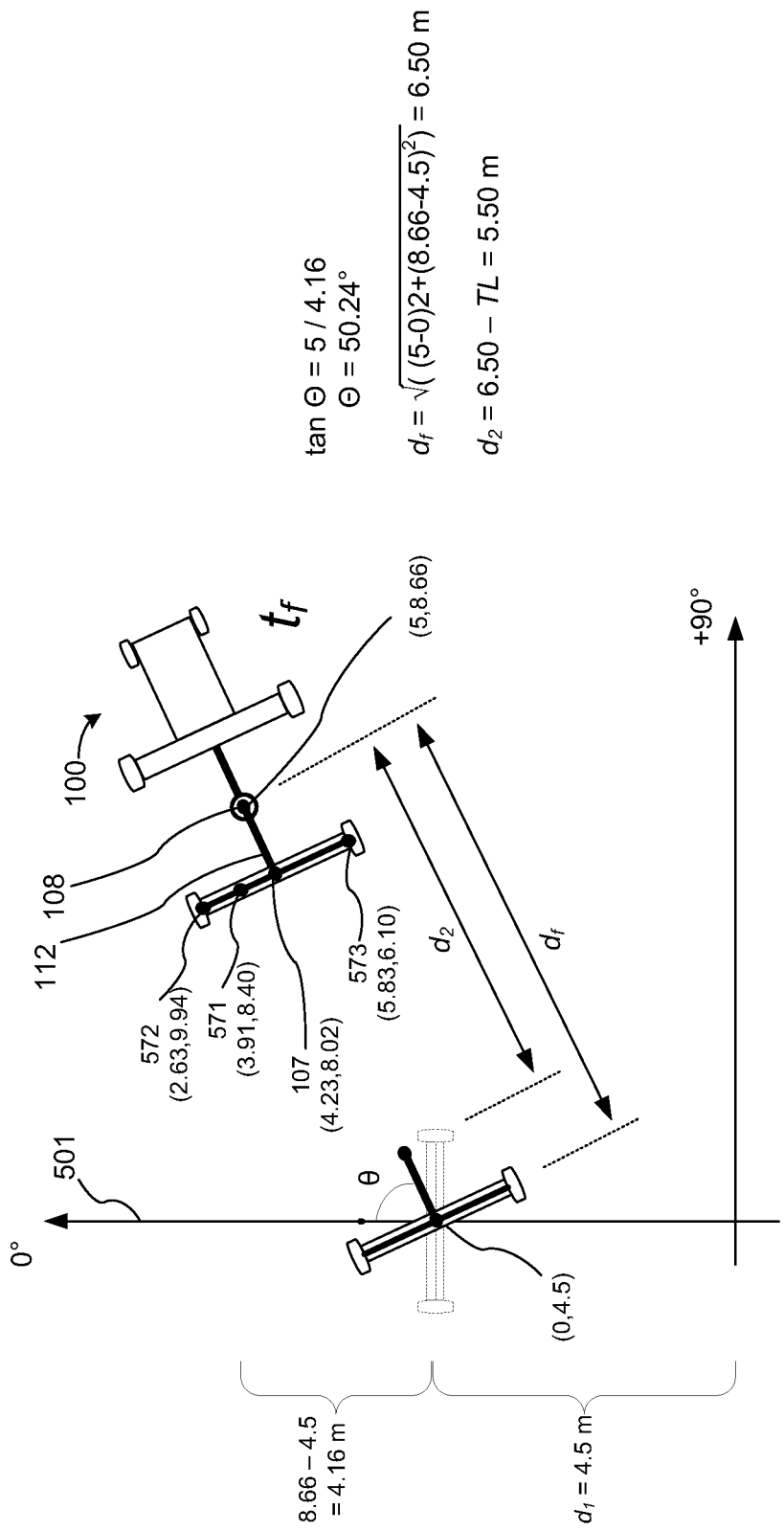
FIG. 5B is an example illustrating generally a portion of a position-determining algorithm.

The distance from the initial location to the intermediate location (the "intermediate distance") is determined based on the linear distance $d_L$ between the initial and destination locations and the length of the tongue 112. In an example, the intermediate distance is one half of the linear distance less the length of the tongue 112 TL. That is, the intermediate distance is one half of the difference between the linear distance (the distance between the initial and destination locations) and the tongue 112 length TL. In an example, the linear distance $d_L$ is 10 m, and the tongue 112 length TL is 1 m. Accordingly, the intermediate distance is: ½(10−1)=4.5 m. In the example of FIGS. 5A and 5B, the heading of the first trailing vehicle 106 at time $t_i$ is 0° (e.g., due north), the location of the axle fiducial 107 at time $t_i$ is (0,0) in the plane 501, the length of the tongue 112 is 1 m, the linear distance between the initial and destination locations is 10 m, and the intermediate distance is 4.5 m; therefore, the intermediate location of the axle fiducial 107 is (0,4.5).

The heading of the axle fiducial 107 and the articulating joint 108 are the same at the destination location. The position-determining algorithm determines this heading using information about the intermediate location. When the axle fiducial 107 of the first trailing vehicle 106 coincides with the intermediate location, the first trailing vehicle 106 is turned or rotated about the axle fiducial 107 in the direction of the destination location to determine the final heading. That is, the final heading of the first trailing vehicle 106 corresponds to a direction of the shortest path between the axle fiducial 107 and the destination location when the axle fiducial 107 is at the intermediate location.

FIG. 5B shows an example calculation for the final heading and the final location of the axle fiducial 107 at time $t_f$. Continuing the previous numerical example, the intermediate location of the axle fiducial 107 is (0,4.5), as shown in the example of FIG. 5B. The first trailing vehicle 106 is then turned such that its tongue axis intersects with the destination location. In this example, the tongue axis intersects with the destination location (5,8.66).

The heading of the first trailing vehicle 106 from the intermediate location to the destination location is determined using basic trigonometric techniques, such as illustrated in the example of FIG. 5B. In the example of FIG. 5B, the distance in the 0° heading direction from the intermediate location to the destination location is the difference of the y components of the destination location and the intermediate location, that is, 4.16 m. The distance in the 90° heading direction from the intermediate location to the destination location is the difference of the x components of the destination location and the intermediate location, that is, 5 m. Accordingly, the tangent of the heading angle θ is the quotient of 5 and 4.16, and θ=50.24°. Therefore, the angle θ is the heading of the first trailing vehicle 106 (and all of the points thereon) when the first trailing vehicle 106 is coupled with the leading vehicle 102 at the articulating joint 108, and the articulating joint 108 is positioned at the destination location.

The total distance $d_f$ from the axle fiducial 107 at the intermediate location (0,4.5) and the destination location (5,8.66) is determined using a root-sum-square technique, and in this example, $d_f$=6.5 m. The total distance traveled by the first trailing vehicle 106 from the intermediate location to the destination location is $d_2$, which is the total distance $d_f$ less the tongue length TL. In this example, $d_2$=5.5 m.

Again using trigonometric techniques, the coordinates of the axle fiducial 107 at $t_f$ are determined, such as using information about the heading angle θ=50.24°. When the articulating joint 108 corresponds to the destination location, the axle fiducial 107 is positioned on the axis of intersection of the destination location and the intermediate location but is spaced away from the destination location by the tongue length TL. The x coordinate of the axle fiducial 107 at $t_f$ is the destination x coordinate (5) less the tongue length TL multiplied by the sine of θ. That is, the x coordinate of the axle fiducial 107 at $t_f$ is 5−(1) sin 50.24°, or 4.23. Similarly, the y coordinate of the axle fiducial 107 at $t_f$ is the destination y coordinate 8.66, less the tongue length TL multiplied by the cosine of θ: 8.66−(1) cos 50.24°, or 8.02. Thus, the coordinates of the axle fiducial 107 at time $t_f$ are (4.23,8.02). In sum, using information about an initial location of the first trailing vehicle 106, a destination location, and a tongue length of the first trailing vehicle, the location and heading of the first trailing vehicle are determined at the destination location.

In an example, a location or heading of an implement associated with the first trailing vehicle 106 is determinable using the information about the first trailing vehicle location and heading. For example, a first implement 571 is coupled to the first trailing vehicle 106, such as along a boom of the first trailing vehicle that corresponds to the axis of the first trailing vehicle. In the example of FIG. 5B, the first implement 571 is spaced apart from the axle fiducial 107 by 0.5 m. Again using trigonometric techniques, the location of the first implement 571 is determinable, such as using the coordinates of the axle fiducial 107 at time $t_f$. In the prior numerical example, the coordinates of the axle fiducial 107 at time $t_f$ are (4.23,8.02). Because the angle between the axle of the first trailing vehicle 106 and the tongue 112 is a right angle, the coordinates of the first implement 571 are determined to be (3.91,8.40) when the first trailing vehicle 106 is at the destination location.

Similarly, endpoints of the boom of the first trailing vehicle 106 are determined. In the example of FIG. 5B, the first trailing vehicle 106 is 5 meters wide, and the axle fiducial 107 is positioned at the center of the first trailing vehicle 106 boom. Thus, at the destination location, a first boom end 572 of the first trailing vehicle 106 corresponds to coordinates (2.63,9.99), and a second opposite boom end 573 of the first trailing vehicle 106 corresponds to coordinates (5.83,6.10).

Figure 6:
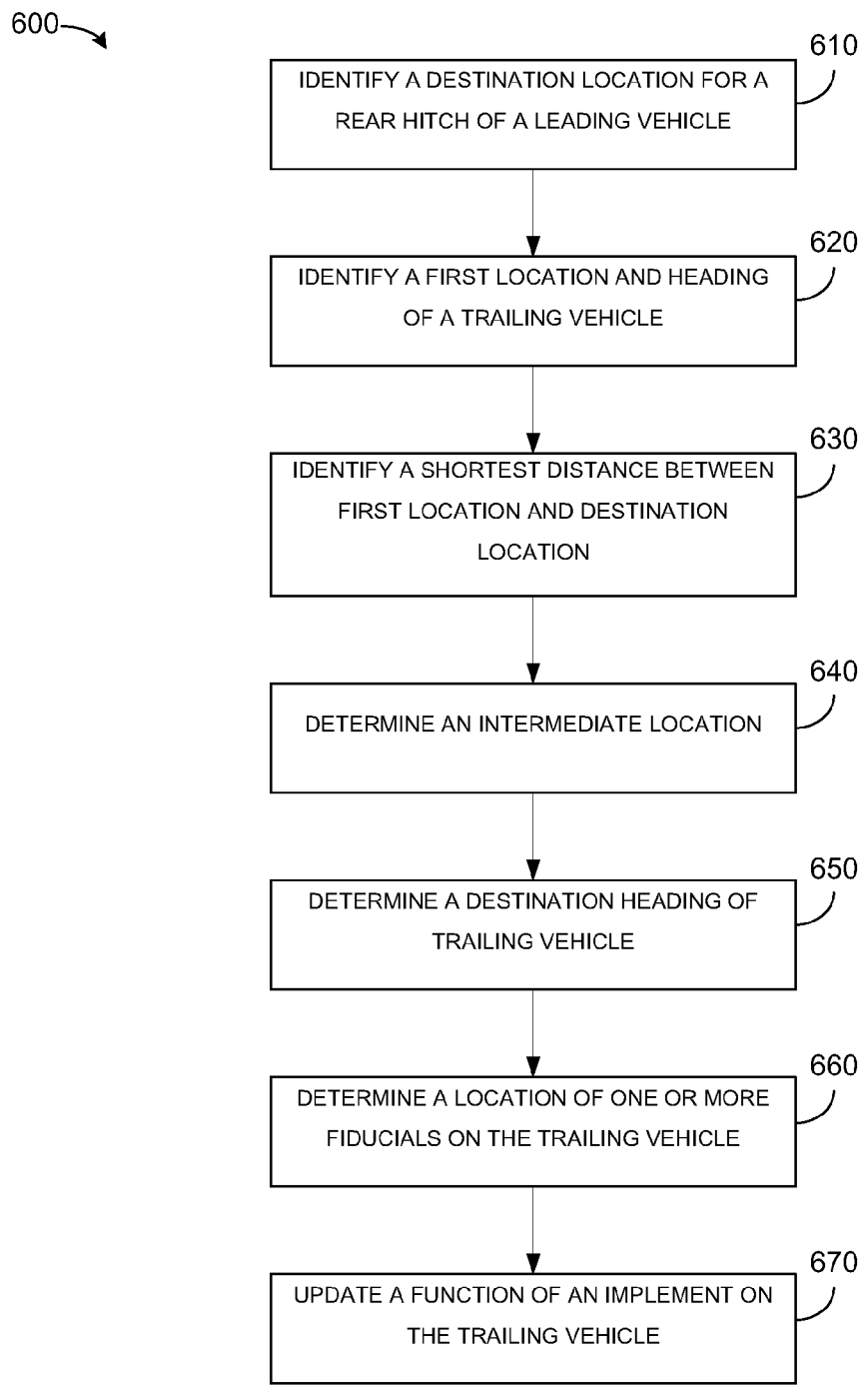
FIG. 6 is a block diagram illustrating an example of a method for determining a location and heading of a trailing vehicle coupled to a leading vehicle.

FIG. 6 illustrates a block diagram showing a method 600 for determining a location of one or more fiducials on a boom of a trailing vehicle, and optionally updating a function of an implement associated with the trailing vehicle. In an example, all or a portion of the method 600 is performed by the field computer 302 on board the leading vehicle 420, such as by the processor 310 executing instructions stored by the memory 308. In an example, at least a portion of the method 600 is performed by a processor circuit corresponding to an implement on the trailing vehicle, or by a remote processor circuit that is communicatively coupled with a leading vehicle control module or an implement control module.

At 610, a destination location is identified for a rear hitch of a leading vehicle. Referring again to FIG. 4, for example, the leading vehicle 420 includes a rear hitch 410 and a first articulating joint 408 that couples the leading vehicle 420 to the first trailing vehicle 406. The destination location identified at 610 is optionally a final location of the first articulating joint 408, such as after the leading vehicle 420 and the first trailing vehicle 406 undergo some change in position from an initial location to a final, destination location. In an example, the destination location is identified using position information received by a sensor coupled to the leading vehicle, such as using the GPS receiver 300.

In an example, the received position information corresponds to a particular location of the receiver or antenna on the leading vehicle. Accordingly, identifying the destination location for the rear hitch at 610 includes identifying a destination location of the receiver on the leading vehicle. Then, using known dimensional information about the leading vehicle including relative position information about the receiver and the rear hitch, the destination location of the rear hitch is identified.

In some examples, the leading vehicle position sensor (e.g., the GPS receiver 300) is positioned on the leading vehicle behind the vehicle's axle. To determine the location of the rear hitch and the articulating joint thereon, the position-determining algorithm identifies a presumed rear hitch location based on at least two or three prior samples of the leading vehicle position. In some examples, the rear hitch location is determined based on two prior samples, such as when the leading vehicle position sensor is considered to travel in a straight line between samples, and the direction between the two samples is the direction of travel of the leading vehicle. In some examples where the leading vehicle position sensor is positioned on the leading vehicle behind the vehicle's axle, the rear hitch location is determined based on three prior samples. The three samples provide an indication of the leading vehicle's direction and position at a subsequent time by approximating a curvature of the path traversed by the leading vehicle, or by approximating a rate at which the leading vehicle turns along the path.

At 620, a first location and heading of the trailing vehicle is identified. In an example, the first location and heading of the trailing vehicle corresponds to the articulating joint 408 at the tip of the tongue 412 of the first trailing vehicle 406. In an example, the first location and heading of the trailing vehicle corresponds to the axle fiducial of the first trailing vehicle 406, that is, the intersection of an axis of the axle of the first trailing vehicle 406 and the forward-facing axis of the tongue 412.

In an example, the first location of the trailing vehicle is identified using known (i.e., predefined and stored, such as using the memory 308) dimensional information about the first trailing vehicle 406. For instance, information about the tongue 412 length is optionally used to identify a location of the axle fiducial when the location of the leading vehicle rear hitch 410 is known.

In some examples, the location and heading of the trailing vehicle is determined at 620 after the leading vehicle pulls the trailing vehicle by a distance at least equal to that of the tongue length. That is, the location and heading of the trailing vehicle is determined using information about the initial location of the rear hitch and information about the location of the rear hitch after the leading vehicle travels a distance equal to the trailing vehicle tongue length, such as when the leading vehicle is coupled to the trailing vehicle. In this example, the heading of the trailing vehicle is the same as the heading of the leading vehicle.

At 630, a shortest distance between the first location and the destination location is identified. That is, the linear distance between the first location (identified at 620) and the destination location (identified at 610) is identified at 630. In an example, the first location corresponds to the axle fiducial of the trailing vehicle, and the destination location corresponds to the final position of the articulating joint between the leading vehicle and the trailing vehicle.

At 640, an intermediate location is determined. The intermediate location is a location between the initial location of the trailing vehicle and the destination location. That is, the intermediate location is less than the shortest linear distance identified at 630, although it is not necessarily in the direction of the line connecting the shortest distance between the initial and destination locations. In an example, the intermediate location is a location that is spaced from the initial location of the trailing vehicle by one half of the linear distance identified at 630. The intermediate location is spaced from the initial location of the trailing vehicle in a direction that is the same as the initial heading of the trailing vehicle. Referring briefly to the example of FIGS. 5A and 5B, the initial location of the trailing vehicle 106 is the axle fiducial 107 of the trailing vehicle 106 is the origin of the plane 501, and the initial heading of the trailing vehicle 106 is due north, or 0°. The intermediate location is spaced from the origin by one half of $d_L$ and is positioned along the 0° heading, that is, ahead of the trailing vehicle 106 in the direction the vehicle was headed at the initial time.

At 650, a destination heading of the trailing vehicle is determined. In an example, the destination heading of the trailing vehicle is in the direction of the shortest path from the intermediate location to the destination location. The shortest path will be the linear path from the intermediate location of the trailing vehicle axle fiducial to the destination location. Referring again to FIG. 5B, the trailing vehicle 106 is turned about its axle fiducial 107 when the trailing vehicle 106 is at the intermediate location. The trailing vehicle 106 is turned until its tongue 112 is pointing in the direction of the destination location. In the example of FIG. 5B, the trailing vehicle 106 is turned by θ=50.24° east of due north, which is the destination heading of the trailing vehicle 106.

At 660, a location of one or more fiducials on the trailing vehicle is determined. For example, since the destination location and the destination heading of the trailing vehicle are known, the location and heading of any fiducials on the trailing vehicle is optionally determined. In an example, the fiducials include locations of one or more implements on the trailing vehicle, or locations of one or both ends of a boom of the trailing vehicle.

In an example, a fiducial location on the trailing vehicle includes a trailing vehicle rear hitch location. Optionally, using the location of the trailing vehicle rear hitch, the position-determining algorithm is applied to determine position and heading information about one or more subsequent trailing vehicles (e.g., to a second trailing vehicle that is coupled to the first trailing vehicle at an articulating joint). That is, the trailing vehicle rear hitch location is considered to be a "leading vehicle" hitch for the purposes of applying the method to a second trailing vehicle.

At 670, a function of one or more implements on the trailing vehicle is updated using the determined information about the location of the one or more implements. For example, at least one of the fiducials determined at 660 corresponds to a location of an implement on the trailing vehicle, and the determined location corresponds to a field position of the implement (or a known position of an implement relative to the determined location). In an example, the field computer 302, or a processing module on the implement, is configured to provide a control signal to the implement to update a function or operational status of the implement using the determined location information.

In an example, the implement is an agricultural row unit configured to dispense seed or spray fertilizer in response to the control signal from the field computer 302 or the on-board processing module. Accordingly, a seed dispensing rate, fertilizer application rate, seed type selection, or fertilizer type selection, among other functions, is performed or adjusted automatically by the row unit in response to the control signal which is based on the position or heading information, or both. In an example, the row unit is powered up or down, or enters a reduced power stand-by mode, based on the control signal. Optionally, the control signal is further or alternatively based on a determined speed of the row unit, as discussed below in the example of FIGS. 7 and 8.

In an example, a velocity-determining algorithm is optionally used to compute a speed and heading of one or more fiducials associated with a trailing vehicle, such as fiducials corresponding to one or more row units on a trailing vehicle boom. The velocities are determined as signed quantities, that is, as speeds that include a direction component. Direction component information is used because a first boom end may move backward while the opposite boom end on the same trailing vehicle is moving forward, as occurs in some scenarios involving sufficiently tight turns.

In an example, the velocity-determining algorithm begins with identifying initial position information about the ends of a boom of a trailing vehicle, such as using the position-determining algorithm described herein, or other techniques, such as using GPS or other positioning information received by sensors positioned at the boom ends. The initial heading of the trailing vehicle and the boom are also identified.

Figure 7:
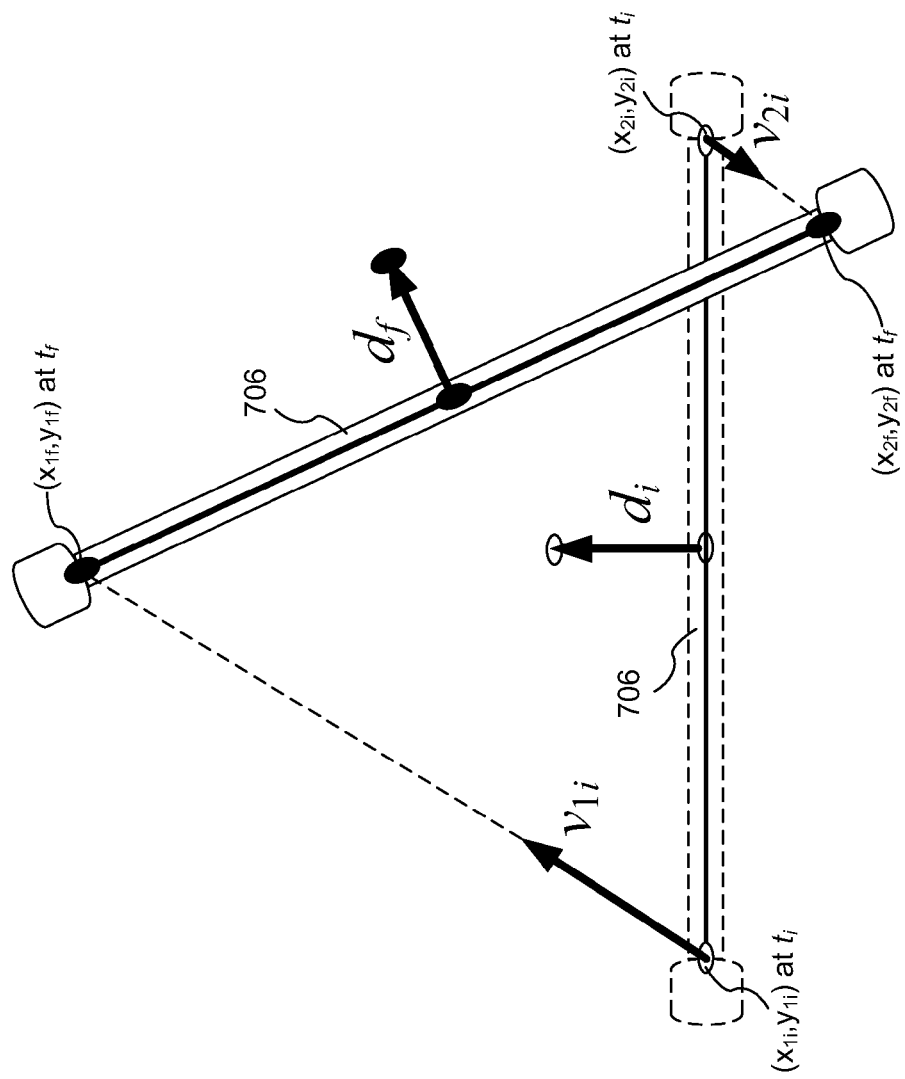
FIG. 7 is an example illustrating generally a portion of a speed-determining algorithm.

FIG. 7 graphically illustrates boom end position and vehicle heading variables for a trailing vehicle 706 at an initial time and a final time after the trailing vehicle 706 has undergone a turn. For example, the coordinates $(x_{1i}, y_{1i})$ and $(x_{2i}, y_{2i})$ correspond to the positions of respective first and second boom ends at an initial time $t_i$. Similarly, the coordinates $(x_{1f}, y_{1f})$ and $(x_{2f}, y_{2f})$ correspond to the positions of the respective first and second boom ends at a final time $t_f$. The trailing vehicle 706 heading at the initial time is $d_i$, and the heading at the final time is $d_f$.

The velocity of each boom end is computed using information about the initial and final positions of the boom ends and the time difference between the position samples. For instance, the velocity $v_{1i}$ of the first boom end is computed as:

$$v_{1i} = \frac{\sqrt{(x_{1f} - x_{1i})^2 + (y_{2f} - y_{2i})^2}}{t_f - t_i} \quad \text{(Equation 1)}$$

In some examples, position information about the boom ends is in terms of radius vectors from the respective boom ends, that is, as quantities having magnitude and direction components. If radius vectors are used, the velocity $v_{1i}$ is computed as the difference of the initial and final vectors divided by the time difference between the samples.

In some examples, such as when row unit implements are used to apply an agricultural product, sideways motion (e.g., parallel to the boom axis) can be disregarded. For instance, an application rate for an agricultural product may depend only on a motion component that is perpendicular to the boom, that is, in the forward direction. Thus, only the scalar speed quantity in the direction perpendicular to the boom is of interest in some applications. The scalar speed is computed as the dot product of the velocity vector and the unit vector corresponding to the direction of the trailing vehicle, that is, the direction perpendicular to the boom. The scalar speed is optionally computed for each of the initial and final times. For example, the speed of the first boom end is computed as:

$$s_{1i} = d_i \cdot v_{1i} \quad \text{(Equation 2)}$$

$$s_{1f} = d_f \cdot v_{1i} \quad \text{(Equation 3)}$$

In an example, if the initial and final times are sufficiently close together in time and position, there may be only a negligible difference in the calculated speeds. In other examples, there is a significant difference between the calculated speeds, such as when the trailing vehicle is traveling particularly quickly (or rotating quickly) or when there is a relatively long sample interval. In an example, an average speed is computed by averaging the quantities $s_{1i}$ and $s_{1f}$. The average is equivalent to calculating the speed a virtual boom that is interpolated half way between the actual boom locations.

In an example, the speed computations are repeated for a second boom end. Once the signed speed values are known at each end of a boom, the speed of any point along the boom is determinable by interpolating between the speed values (e.g., based on the relative spacing of implements relative to the boom ends). In an example an agricultural product is applied using one or more row unit implement dispensers, the product per unit area coverage of the field for each row unit implement dispenser is inversely proportional to the absolute value of the interpolated speed. That is, because the speed information is provided in the direction of travel, the coverage is the same as it would be if the trailing vehicle and the implement were moving straight ahead at speed s.

In an example that includes dispensing an agricultural product, an application rate of each implement (e.g., a volume dispensed from a sprayer nozzle or planter head) is made proportional to the determined speed s of the implement. If the speed becomes a negative value, such as occurs at implements positioned near a boom end toward the inside of a tight turn, some small portion of the field will be sprayed more than once. For example, it will be sprayed with the implement moving forward over the area, then backward over the same area, then once again when the implement moves forward once again. Accordingly, over-spraying can be mitigated by adjusting the application rate or ceasing application altogether when a speed s becomes or trends toward a negative value.

In an example, the processor 310 (see FIG. 4) computes or receives information about an implement speed and position, such as using the position-determining and velocity-determining algorithms described herein. The processor 310 provides a control signal (e.g., using the transmission lines 471, 472) to one or more implements in an implement train based on the position and speed information. For instance, a row unit on a trailing vehicle receives the control signal and responds by adjusting an agricultural product dispensing rate. In an example, speed and position computations are performed periodically or intermittently throughout the duration of fieldwork, and information is exchanged between the field computer 302 and the implements to update an implement status as needed over the course of the fieldwork.

Figure 8:
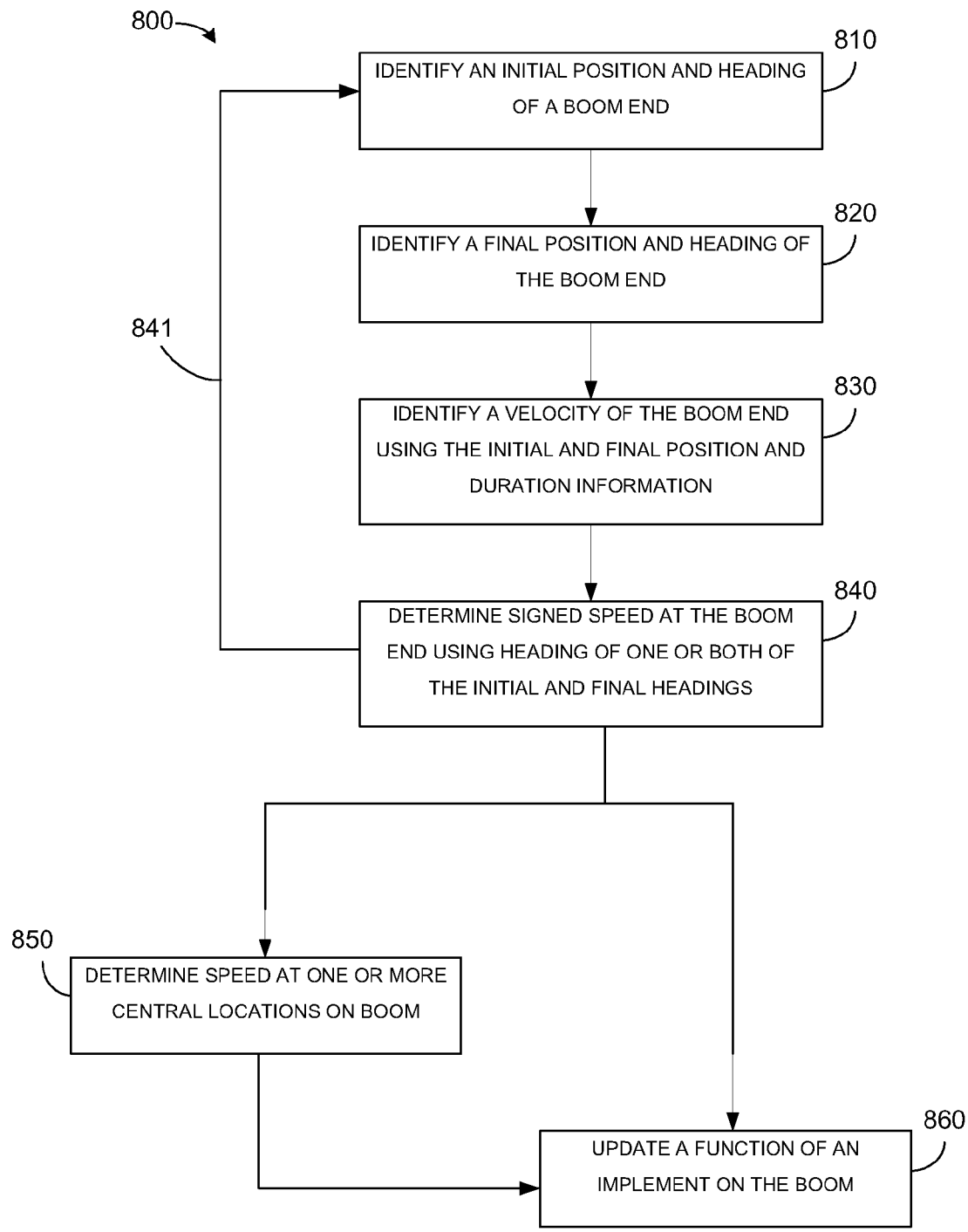
FIG. 8 is a block diagram illustrating an example of a method for determining a speed of one or more fiducials on a trailing vehicle.

FIG. 8 illustrates a block diagram showing a method 800 for determining a speed at one or more locations on a boom of a trailing vehicle, and optionally updating a function of an implement associated with the boom. In an example, all or a portion of the method 800 is performed by the field computer 302 on board the leading vehicle 420, such as by the processor 310 executing instructions provided by the memory 308. In an example, at least a portion of the method 800 is performed by a processor circuit corresponding to an implement on the trailing vehicle, or by a remote processor circuit that is communicatively coupled with a leading vehicle control module or an implement control module.

At 810, an initial position and heading of a boom end is identified for a first trailing vehicle. The initial position and heading is optionally determined using the method 600, such as at 660, including determining a location of one or more fiducials on a trailing vehicle (i.e., including determining a location of a boom end). The boom end optionally includes a location at the furthest extent of the boom, a location of an implement furthest from the trailing vehicle tongue, or some other location along the boom that is considered an "end" of the boom. In an example, the initial position and heading is determined another way, such as using information from a position sensor disposed at the boom end.

At 820, a final position and heading of the boom end is determined, such as using the same or different method than is used at 810 to determine the initial position and heading. In an example, the initial and final position information is provided as coordinates on a Cartesian plane. In another example, the initial and final positions are provided together with their respective heading information in vector form.

At 830, a velocity of the boom end is identified, such as using the initial and final position information identified at 810 and 820 with information about the duration between the position samples. In an example, the velocity of the boom end is computed using Equation (1). In another example, the velocity of the boom end is determined another way, such as using a speed sensor positioned at the boom end. In an example, the velocity of the boom end is computed by differencing the radius vectors corresponding to the initial and final boom end positions.

At 840, a signed speed of the boom end is determined. That is, a scalar speed value corresponding to the boom end is determined together with an indication whether the boom end is traveling forward (a positive value) or backward (a negative value). As described above, a negative speed is possible when the boom end travels backward, such as when the boom end is at the inside of a tight turn. In an example, the signed speed is computed using one or both of Equations (2) and (3). In some examples, the signed speeds computed using Equations (2) and (3) will be sufficiently different that taking the average of the signed speeds provides more meaningful information about a fiducial speed on the boom. For instance, when the trailing vehicle is traveling very quickly or the sample interval is extended, the average of the signed speeds will better approximate the speed of the boom end over the course of travel.

At 841, the method 800 optionally returns to 810 to identify an initial position and heading of a different boom end. For example, steps 810-840 are performed for a first boom end, and then repeated for a second boom end. By performing the computations at both boom ends, speed information about intermediate locations along the boom are determined by interpolation. Alternatively, the method 800 is conducted at the same time for the different boom end as it is for the first boom end (e.g., to simultaneously track the speed of the boom ends).

At 850, if boom end speed information is available for at least two points that are spaced apart along the boom (e.g., ends of the boom), a speed at one or more other locations on the boom is determinable. For example, by determining a signed speed of a first boom end and a signed speed of a second boom end, speeds are determined for locations between the first and second boom ends by interpolation between the boom ends. In the case of one boom end having a positive speed and the other having a negative speed, the location along the boom corresponding to a zero speed is the location about which the boom is rotating or turning. In some examples, speed information about points on the boom other than at the boom ends can be used. For example, a speed of a first boom end and a speed of a central point on the boom can be determined. Speeds are determinable for locations between these points using interpolation, and speeds are determinable for other locations (e.g., between the central point and the second boom end) using extrapolation.

At 860, a function of an implement on the boom is updated. In an example, when an implement corresponds to the location of the boom end whose speed was determined at 810-840, the implement function is updated immediately following 840. However, if the implement does not correspond to the boom end, the implement speed is determined at 850, and the implement function is updated following the speed determination for the implement (e.g., with interpolation). In an example, the method 800 is repeated throughout the course of fieldwork, or as often as desired to provide accurate speed information about one or more locations on a boom of a trailing vehicle in an implement train.

Examples & Additional Notes

Example 1 can include or use subject matter such as an apparatus, a method, or a means for performing acts, such as can include or use a method for determining a location or heading of one or more fiducials of a trailing vehicle in an implement train based on information about a rear hitch of a leading vehicle of the implement train. In Example 1, the method includes identifying a destination location for a rear hitch of a leading vehicle, identifying a first location and a first heading of a trailing vehicle, and determining a destination heading of the trailing vehicle when the rear hitch of the leading vehicle coincides with a front hitch of the trailing vehicle and the destination location. In Example 1, determining the heading includes identifying a linear distance between the first location and the destination location, determining an intermediate location ahead of the first location by less than the linear distance and in the direction of the first heading, and determining the destination heading of the trailing vehicle, the destination heading corresponding to a direction of a shortest path from the intermediate location to the destination location. Example 1 optionally includes determining a location of one or more fiducials on the trailing vehicle, the determining using the destination location and the destination heading.

Example 2 can include, or can optionally be combined with the subject matter of Example 1, to optionally include determining the destination heading of the trailing vehicle, including determining the destination heading of the trailing vehicle when the rear hitch of the leading vehicle coincides with the front hitch of the trailing vehicle, wherein the rear hitch and the front hitch are coupled using an articulating joint.

Example 3 can include, or can optionally be combined with the subject matter of one or any combination of Examples 1 or 2 to optionally include identifying the first location and the first heading of the trailing vehicle, including identifying a first location and a first heading of a trailing vehicle fiducial, and wherein determining the destination heading of the trailing vehicle includes determining the destination heading of the trailing vehicle fiducial.

Example 4 can include, or can optionally be combined with the subject matter of one or any combination of Examples 1 through 3 to optionally include computing the linear distance using coordinate information about the first location and coordinate information about the destination location.

Example 5 can include, or can optionally be combined with the subject matter of one or any combination of Examples 1 through 4 to optionally include determining the location of one or more fiducials on the trailing vehicle, including determining a location of at least one implement of a plurality of implements on the trailing vehicle.

Example 6 can include, or can optionally be combined with the subject matter of Example 5 to optionally include determining the location of the at least one implement of the plurality of implements on the trailing vehicle, including identifying the location of the at least one implement along a boom of the trailing vehicle, wherein the boom extends parallel to an axle of the trailing vehicle.

Example 7 can include, or can optionally be combined with the subject matter of one or any combination of Examples 5 or 6 to optionally include updating an operational status of the at least one implement using the determined location of the at least one implement.

Example 8 can include, or can optionally be combined with the subject matter of Example 7 to optionally include updating the operational status of the at least one implement, including initiating or interrupting release of an organic material from the implement.

Example 9 can include or use subject matter such as an apparatus, a method, or a means for performing acts, such as can include or use a massed machine-readable medium (MMRM) including instructions that, when executed by a machine, cause the machine to perform operations that include identifying a destination location of a leading vehicle fiducial of a leading vehicle, the leading vehicle fiducial coincident with a first fiducial of a first trailing vehicle of an implement train, identifying an initial heading corresponding to the first fiducial and a second fiducial of the first trailing vehicle when the second fiducial coincides with an initial location, and determining a heading of the first and second fiducials of the first trailing vehicle when the first fiducial coincides with the destination location. In Example 9, determining the heading includes identifying a linear distance between the destination location and the initial location, and determining an intermediate location based on the linear distance and the initial heading, the intermediate location between the initial location and the destination location, and optionally determining a location and heading of a third fiducial of the first trailing vehicle, based on the heading of the first and second fiducials when the first fiducial coincides with the destination location.

Example 10 can include, or can optionally be combined with the subject matter of Example 9 to optionally include identifying the linear distance between the destination location and the initial location, including computing the linear distance.

Example 11 can include, or can optionally be combined with the subject matter of one or any combination of examples 9 or 10 to optionally include determining the location and heading of the third fiducial, including determining a location and heading of at least one implement of a plurality of implements, the at least one implement corresponding to the third fiducial and disposed on a boom of the first trailing vehicle, and determining the location of the at least one implement including identifying a location of the implement along the boom.

Example 12 can include, or can optionally be combined with the subject matter of Example 11 to optionally include operations including updating an operational status of the at least one implement using the determined location of the at least one implement, the updating the operational status including one of initiating or interrupting release of material from the implement.

Example 13 can include, or can optionally be combined with the subject matter of one or any combination of examples 11 or 12 to optionally include determining the location of the at least one implement, including determining a location of an agricultural row unit in a Cartesian plane corresponding to an agricultural field.

Example 12 can include, or can optionally be combined with the subject matter of Example 11 to optionally include, as the agricultural row unit, one of a planter unit or a fertilizer unit.

Example 15 can include, or can optionally be combined with the subject matter of one or any combination of Examples 9 through 14 to optionally include operations that include estimating a velocity of the third fiducial, the third fiducial corresponding to a location of a first implement coupled to the first trailing vehicle, estimating the velocity based on prior information about the location of the third fiducial, and based on information about a relative location of the third fiducial on the first trailing vehicle relative to a boom end of the first trailing vehicle.

Example 16 can include, or can optionally be combined with the subject matter of Example 15 to optionally include operations including estimating a velocity of a fourth fiducial corresponding to a location of a second implement coupled to the first trailing vehicle, wherein the velocity of the fourth fiducial is different than the velocity of the third fiducial, and wherein estimating the velocity of the fourth fiducial includes using information about the relative locations of the third and fourth fiducials.

Example 17 can include, or can optionally be combined with the subject matter of one or any combination of Examples 9 through 16 to optionally include determining the intermediate location, including determining a location spaced from the initial location by a distance that is half of the identified linear distance.

Example 18 can include, or can optionally be combined with the subject matter of Example 17 to optionally include determining the intermediate location, including determining a location between the initial location and the destination location that corresponds with the initial heading.

Example 19 can include, or can optionally be combined with the subject matter of one or any combination of Examples 9 through 18 to optionally include determining the heading of the first and second fiducials, including when the first fiducial and the leading vehicle fiducial are coupled with an articulating joint.

Example 20 can include, or can optionally be combined with the subject matter of one or any combination of Examples 9 through 19 to optionally include operations including determining a location and heading of a fifth fiducial of a second trailing vehicle of the implement train, when the first fiducial coincides with the destination location and the second trailing vehicle is coupled to the first trailing vehicle with an articulating joint.

Example 21 can include, or can optionally be combined with the subject matter of Example 20 to optionally include determining the location and heading of the fifth fiducial, including identifying a second destination location of the fifth fiducial, the fifth fiducial coincident with a hitch fiducial of the first trailing vehicle, identifying a second initial location and second initial heading of the fifth fiducial of the second trailing vehicle, and determining a heading of the fifth fiducial of the second trailing vehicle when the first fiducial coincides with the destination location. In Example 21, determining the heading of the fifth fiducial optionally includes identifying a second linear distance between the second destination location and the second initial location, and determining a second intermediate location based on the second linear distance and the second initial heading, the second intermediate location between the second initial location and the second destination location. Example 21 optionally further includes determining a location and heading of a sixth fiducial of the second trailing vehicle, based on the heading of the fifth fiducial when the fifth fiducial coincides with the second destination location.

Example 22 can include, or can optionally be combined with the subject matter of one or any combination of Examples 9 through 21 to optionally include identifying the destination location of the leading vehicle fiducial, including identifying the destination location of a leading vehicle hitch fiducial using information about a distance between the leading vehicle hitch fiducial and an antenna, the antenna coupled to the leading vehicle and configured to receive a location signal.

Example 23 can include or use subject matter such as an apparatus, a method, or a means for performing acts, such as can include or use a method for identifying a location and direction of a first trailing vehicle based on a location of a leading vehicle, the leading vehicle coupled to the first trailing vehicle using an articulating joint. Example 23 includes determining a linear distance between an initial location of a first trailing vehicle axle fiducial and a destination location for a front hitch of the first trailing vehicle, the destination location corresponding to a rear hitch of a leading vehicle, determining a first increment path having a direction perpendicular to an axle of the first trailing vehicle when the axle fiducial is at the initial location, determining a first increment endpoint spaced from the initial location a distance less than the determined linear distance, determining a second increment direction, based on the first increment endpoint and the destination location for the front hitch, wherein the second increment path length is less than the determined linear distance, and identifying a location and direction of the first trailing vehicle when the front hitch corresponds with the destination location, using the second increment direction.

Example 24 can include or use subject matter such as an apparatus, a method, or a means for performing acts, such as can include or use a system including a processor circuit and a tangible processor-readable medium, coupled to the processor circuit, comprising instructions that, when executed by the processor circuit, cause the processor circuit to receive information about a distance between an initial location of a first trailing vehicle fiducial and a destination location of the first trailing vehicle, receive information about an initial heading of the first trailing vehicle fiducial, determine a heading of the first trailing vehicle fiducial when the first trailing vehicle is at the destination location, the heading based on an intermediate location between the initial location and the destination location, and provide a control signal to one or more implements associated with the first trailing vehicle based on the determined heading, the control signal usable by the one or more implements to update a function of at least one implement.

Example 25 can include, or can optionally be combined with the subject matter of Example 24 to optionally include instructions to cause the processor circuit to determine, as the distance between the initial location and the destination location, a linear distance between the initial location and the destination location.

Example 26 can include, or can optionally be combined with the subject matter of any one of Examples 24 or 25 to optionally include a leading vehicle including a rear hitch, wherein the rear hitch is joined to the first trailing vehicle at an articulating joint that coincides with the first trailing vehicle fiducial.

Example 27 can include, or can optionally be combined with the subject matter of Example 26 to optionally include an antenna, coupled to the leading vehicle, the antenna configured to receive a location signal, and wherein the instructions cause the processor circuit to receive information about the location signal from the antenna, the information about the location signal indicative of the initial location and the destination location of the first trailing vehicle fiducial.

Example 28 can include, or can optionally be combined with the subject matter of Example 27 to optionally include a wireless transmitter, coupled to the leading vehicle, configured to broadcast the control signal from the processor circuit to a wireless receiver associated with one or more implements on the first trailing vehicle.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The term "machine readable medium" as used herein may include a single medium or multiple media (e.g., a centralized or distributed database, and/or associated caches and servers) that are configured to store the one or more instructions. The term "machine readable medium" may include any medium that is capable of storing, encoding, or carrying instructions for execution by a machine (e.g., by the processor circuit 310 or another processor or computer module) and that cause the machine to perform any one or more of the techniques of the present disclosure, or that is capable of storing, encoding or carrying data structures used by or associated with such instructions. Examples of non-limiting machine readable media are discussed above. The instructions may further be transmitted or received over a communications network using a transmission medium via the network interface device utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, a network interface device used with the systems described herein may include one or more physical jacks (e.g., Ethernet, coaxial, or phone jacks) or one or more antennas (e.g., the wireless transceiver 312) to connect to the communications network. In an example, the network interface device may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by a machine, and includes digital or analog communications signals or other intangible medium to facilitate communication of such software.

The present disclosure should not be considered limited to the particular examples described above, but rather should be understood to cover all aspects of the disclosure. Various modifications, equivalent processes, as well as numerous structures to which the present disclosure may be applicable will be readily apparent to those of skill in the art to which the present disclosure is directed upon review of the present specification.

What is claimed is:

1. A method for using information about a determined location or heading of one or more fiducials of a trailing vehicle in an implement train based on information about a rear hitch of a leading vehicle of the implement train, the method comprising:
identifying, using a processor circuit, a destination location for a rear hitch of a leading vehicle;
identifying, using the processor circuit, a first location and a first heading of a trailing vehicle;
determining, using the processor circuit, a destination heading of the trailing vehicle when the rear hitch of the leading vehicle coincides with a front hitch of the trailing vehicle and the destination location, wherein determining the destination heading includes:
identifying a linear distance between the first location of the trailing vehicle and the destination location for the rear hitch of the leading vehicle,
determining an intermediate location ahead of the first location of the trailing vehicle by less than the linear distance and in the direction of the first heading of the trailing vehicle, and
determining the destination heading of the trailing vehicle, the destination heading corresponding to a direction of a shortest path from the intermediate location to the destination location for the rear hitch of the leading vehicle;
determining, using the processor circuit, a location of one or more fiducials on the trailing vehicle, the determining using the destination location for the rear hitch of the leading vehicle and the destination heading of the trailing vehicle; and
updating an operational status of at least one implement, the implement corresponding to the determined location of one of the fiducials on the trailing vehicle, and the updating the operational status including initiating or inhibiting release of an agricultural product from the at least one implement.

2. The method of claim 1, wherein determining the destination heading of the trailing vehicle includes determining the destination heading of the trailing vehicle when the rear hitch of the leading vehicle coincides with the front hitch of the trailing vehicle, wherein the rear hitch and the front hitch are coupled using an articulating joint.

3. The method of claim 1, wherein identifying the first location and the first heading of the trailing vehicle includes identifying a first location and a first heading of a trailing vehicle fiducial, and wherein determining the destination heading of the trailing vehicle includes determining the destination heading of the trailing vehicle fiducial.

4. The method of claim 1, wherein identifying the linear distance between the first location and the destination location includes computing the linear distance using coordinate information about the first location and coordinate information about the destination location.

5. The method of claim 1, wherein the determining the location of one or more fiducials on the trailing vehicle includes determining locations of a plurality of implements on the trailing vehicle.

6. The method of claim 5, wherein the determining the location of the at least one implement of the plurality of implements on the trailing vehicle includes identifying the location of the at least one implement along a boom of the trailing vehicle, wherein the boom extends parallel to an axle of the trailing vehicle.

7. A non-transitory massed machine-readable medium (MMRM) including instructions that, when executed by a machine, cause the machine to perform operations comprising:
identifying a destination location of a leading vehicle fiducial of a leading vehicle, the leading vehicle fiducial coincident with a first fiducial of a first trailing vehicle of an implement train;
identifying an initial heading corresponding to the first fiducial and a second fiducial of the first trailing vehicle when the second fiducial coincides with an initial location;
determining a heading of the first and second fiducials of the first trailing vehicle when the first fiducial coincides with the destination location, determining the heading of the first and second fiducials including:
identifying a linear distance between the destination location of the leading vehicle fiducial and the initial location, and
determining an intermediate location based on the linear distance and the initial heading, the intermediate location between the initial location and the destination location; and
determining a location and heading of a third fiducial of the first trailing vehicle, based on the heading of the first and second fiducials when the first fiducial coincides with the destination location of the leading vehicle fiducial;
wherein the operations comprise updating an operational status of at least one implement, the implement corresponding to the determined location and heading of the third fiducial, and the updating the operational status including initiating or inhibiting release of an agricultural product from the at least one implement.

8. The MMRM of claim 7, wherein the identifying the linear distance between the destination location and the initial location includes computing the linear distance.

9. The MMRM of claim 7, wherein the determining the location and heading of the third fiducial includes determining a location and heading of at least one implement of a plurality of implements, the at least one implement corresponding to the third fiducial and disposed on a boom of the first trailing vehicle, and determining the location of the at least one implement including identifying a location of the implement along the boom.

10. The MMRM of claim 9, wherein the determining the location of the at least one implement includes determining a location of an agricultural row unit in a Cartesian plane corresponding to an agricultural field.

11. The MMRM of claim 10, wherein the agricultural row unit is one of a planter unit or a fertilizer unit.

12. The MMRM of claim 7, wherein the operations comprise estimating a velocity of the third fiducial, the third fiducial corresponding to a location of a first implement coupled to the first trailing vehicle, estimating the velocity based on prior information about the location of the third fiducial, and based on information about a relative location of the third fiducial on the first trailing vehicle relative to a boom end of the first trailing vehicle.

13. The MMRM of claim 12, wherein the operations comprise estimating a velocity of a fourth fiducial corresponding to a location of a second implement coupled to the first trailing vehicle, wherein the velocity of the fourth fiducial is different than the velocity of the third fiducial, and wherein estimating the velocity of the fourth fiducial includes using information about the relative locations of the third and fourth fiducials.

14. The MMRM of claim 7, wherein determining the intermediate location includes determining a location spaced from the initial location by a distance that is half of the identified linear distance.

15. The MMRM of claim 14, wherein determining the intermediate location includes determining a location between the initial location and the destination location that corresponds with the initial heading.

16. The MMRM of claim 7, wherein determining the heading of the first and second fiducials includes when the first fiducial and the leading vehicle fiducial are coupled with an articulating joint.

17. The MMRM of claim 7, wherein the operations comprise determining a location and heading of a fifth fiducial of a second trailing vehicle of the implement train, when the first fiducial coincides with the destination location and the second trailing vehicle is coupled to the first trailing vehicle with an articulating joint.

18. The MMRM of claim 17, wherein determining the location and heading of the fifth fiducial includes:
  identifying a second destination location of the fifth fiducial, the fifth fiducial coincident with a hitch fiducial of the first trailing vehicle;
  identifying a second initial location and second initial heading of the fifth fiducial of the second trailing vehicle;
  determining a heading of the fifth fiducial of the second trailing vehicle when the first fiducial coincides with the destination location, determining the heading of the fifth fiducial including:
    identifying a second linear distance between the second destination location and the second initial location, and
    determining a second intermediate location based on the second linear distance and the second initial heading, the second intermediate location between the second initial location and the second destination location, and
  determining a location and heading of a sixth fiducial of the second trailing vehicle, based on the heading of the fifth fiducial when the fifth fiducial coincides with the second destination location.

19. The MMRM of claim 7, wherein the identifying the destination location of the leading vehicle fiducial includes identifying the destination location of a leading vehicle hitch fiducial using information about a distance between the leading vehicle hitch fiducial and an antenna, the antenna coupled to the leading vehicle and configured to receive a location signal.

20. A method for updating a function of an implement on a first trailing vehicle in am implement train, including identifying a location and direction of the first trailing vehicle based on a location of a leading vehicle, the leading vehicle coupled to the first trailing vehicle using an articulating joint, the method comprising:
  determining, using a processor circuit, a linear distance between an initial location of a first trailing vehicle axle fiducial and a destination location for a front hitch of the first trailing vehicle, the destination location corresponding to a rear hitch of a leading vehicle;
  determining, using the processor circuit, a first increment path having a direction perpendicular to an axle of the first trailing vehicle when the axle fiducial is at the initial location;
  determining, using the processor circuit, a first increment endpoint spaced from the initial location a distance less than the determined linear distance;
  determining, using the processor circuit, a second increment direction, based on the first increment endpoint and the destination location for the front hitch, wherein the second increment path length is less than the determined linear distance;
  identifying, using the processor circuit, a location and direction of the first trailing vehicle when the front hitch corresponds with the destination location, using the second increment direction; and
  updating the function of the implement on the first trailing vehicle using the identified location and direction of the first trailing vehicle, the updating the function including at least one of: changing an implement on/off state, changing a material dispensing rate from the implement, and selecting a material type to dispense from the implement.

21. A system comprising:
  an implement associated with a first trailing vehicle in an implement train;
  a processor circuit; and
  a non-transitory tangible processor-readable medium, coupled to the processor circuit, comprising instructions that, when executed by the processor circuit, cause the processor circuit to:
    receive information about a distance between an initial location of the first trailing vehicle fiducial and a destination location of the first trailing vehicle;
    determine a heading of the first trailing vehicle fiducial when the first trailing vehicle is at the destination location, the heading of the first trailing vehicle fiducial based on an intermediate location between the initial location and the destination location; and
    provide a control signal to update the implement associated with the first trailing vehicle based on the determined heading of the first trailing vehicle fiducial, the update to the implement including initiating or inhibiting the release of an agricultural product from the implement.

22. The system of claim 21, wherein the instructions cause the processor circuit to determine, as the distance between the initial location and the destination location, a linear distance between the initial location and the destination location.

23. The system of claim 21, comprising a leading vehicle including a rear hitch, wherein the rear hitch is joined to the first trailing vehicle at an articulating joint that coincides with the first trailing vehicle fiducial.

24. The system of claim 23, comprising an antenna, coupled to the leading vehicle, the antenna configured to receive a location signal, and wherein the instructions cause the processor circuit to receive information about the location signal from the antenna, the information about the location signal indicative of the initial location and the destination location of the first trailing vehicle fiducial.

25. The system of claim 24, comprising:
  a wireless transmitter, coupled to the leading vehicle, configured to broadcast the control signal from the processor circuit to a wireless receiver associated with one or more implements on the first trailing vehicle.

* * * * *